(12) United States Patent
Iwashita et al.

(10) Patent No.: US 12,102,996 B2
(45) Date of Patent: Oct. 1, 2024

(54) REACTION METHOD, AND REACTION SYSTEM AND REACTION DEVICE IMPLEMENTING SAME

(71) Applicant: Otsuka Pharmaceutical Co., Ltd., Tokyo (JP)

(72) Inventors: Atsuo Iwashita, Tokyo (JP); Youichi Aoki, Saitama (JP)

(73) Assignee: OTSUKA PHARMACEUTICAL CO., LTD., Tokyo (JP)

( * ) Notice: Subject to any disclaimer, the term of this patent is extended or adjusted under 35 U.S.C. 154(b) by 1279 days.

(21) Appl. No.: 16/308,673

(22) PCT Filed: Jun. 14, 2017

(86) PCT No.: PCT/JP2017/021893
§ 371 (c)(1),
(2) Date: Dec. 10, 2018

(87) PCT Pub. No.: WO2017/221775
PCT Pub. Date: Dec. 28, 2017

(65) Prior Publication Data
US 2019/0151841 A1 May 23, 2019

(30) Foreign Application Priority Data

Jun. 21, 2016 (JP) ................................. 2016-122695

(51) Int. Cl.
| | |
|---|---|
| *B01L 3/02* | (2006.01) |
| *B01L 9/00* | (2006.01) |
| *G01N 1/00* | (2006.01) |
| *G01N 1/14* | (2006.01) |
| *G01N 21/64* | (2006.01) |
| *G01N 35/10* | (2006.01) |
| *G01N 37/00* | (2006.01) |

(52) U.S. Cl.
CPC ........... *B01L 3/0286* (2013.01); *B01L 3/0234* (2013.01); *B01L 3/0237* (2013.01); *B01L 9/52* (2013.01); *G01N 1/00* (2013.01); *G01N 1/14* (2013.01); *G01N 21/648* (2013.01); *G01N 35/10* (2013.01); *G01N 35/1011* (2013.01); *G01N 37/00* (2013.01); *B01L 2200/146* (2013.01); *B01L 2300/0627* (2013.01); *B01L 2400/0406* (2013.01); *B01L 2400/082* (2013.01); *G01N 21/64* (2013.01)

(58) Field of Classification Search
None
See application file for complete search history.

(56) References Cited

U.S. PATENT DOCUMENTS

| | | | |
|---|---|---|---|
| 9,080,940 B2 | 7/2015 | Aoki | |
| 2004/0005582 A1* | 1/2004 | Shipwash | ........ G01N 33/54366 435/7.1 |
| 2006/0153736 A1* | 7/2006 | Kalra | ...................... B01L 3/508 422/400 |
| 2008/0145845 A1* | 6/2008 | Remacle | ................ C12Q 1/689 435/6.15 |
| 2009/0136385 A1* | 5/2009 | Handique | ........... F16K 99/0061 422/400 |
| 2009/0223012 A1 | 9/2009 | Hibe | |
| 2012/0045769 A1* | 2/2012 | Treiber | .................. C12Q 1/485 435/6.12 |
| 2013/0312546 A1 | 11/2013 | Wada | |
| 2014/0118747 A1 | 5/2014 | Aoki | |

FOREIGN PATENT DOCUMENTS

| | | |
|---|---|---|
| JP | 11-160327 A | 6/1990 |
| JP | 2005201882 A | 7/2005 |
| JP | 2007-132855 A | 5/2007 |
| JP | 4613283 B2 | 1/2011 |
| JP | 2012-159358 A | 8/2012 |
| JP | 2013186019 A | 9/2013 |
| JP | 2016004022 A | 1/2016 |
| WO | 2008035777 A1 | 3/2008 |
| WO | 2011027851 A1 | 3/2011 |
| WO | 2012105171 A1 | 8/2012 |
| WO | 2012/172992 A1 | 12/2012 |

OTHER PUBLICATIONS

Extended European Search Report dated Jun. 18, 2019 of the corresponding European Patent Application No. 17815244.3.
Notice of Reasons for Refusal dated Jan. 26, 2021 of the corresponding Japanese Patent Application No. 2018-523951 and English translation.
International Search Report dated Aug. 29, 2017 for PCT/JP2017/021893 and English translation.
Written Opinion of the International Searching Authority dated Aug. 29, 2017 from the corresponding International Application No. PCT/JP2017/021893 and English translation.

* cited by examiner

*Primary Examiner* — Ann Montgomery
(74) *Attorney, Agent, or Firm* — LUCAS & MERCANTI, LLP

(57) ABSTRACT

A liquid contact step including injection of liquid into a flow path using a pipette chip and suction of liquid from the flow channel is performed multiple times, and a predetermined reaction is thereby performed inside the flow channel. In at least one liquid contact step, a first suction is performed in which liquid is suctioned in a state in which the pipette chip and the bottom of a liquid injection section are in contact or in close to each other. Meanwhile, in at least one liquid contact step, a second suction is performed in which the liquid is suctioned in a state in which the pipette chip and the bottom of the liquid injection section are more separated than in the first suction.

18 Claims, 11 Drawing Sheets

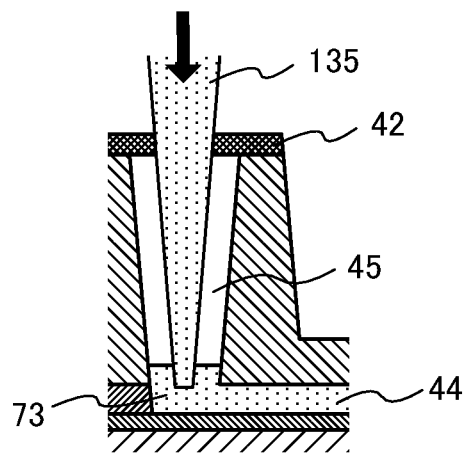
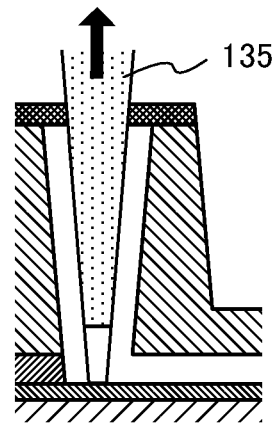
FIG. 6A  FIG. 6B
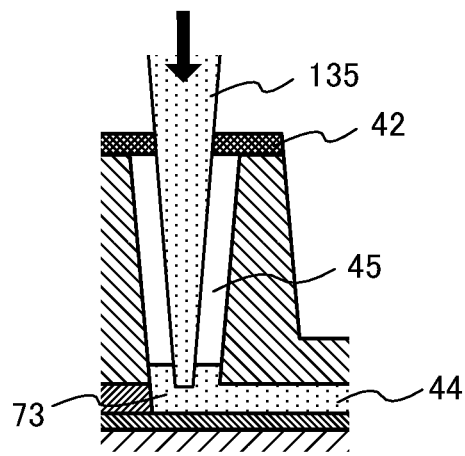
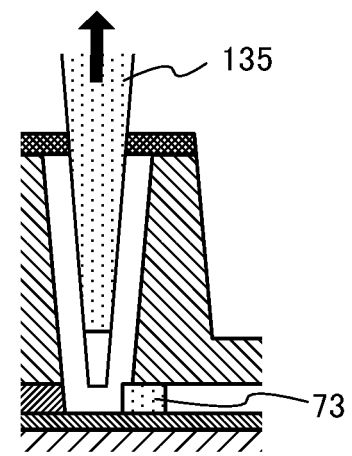
FIG. 6C  FIG. 6D

REACTION METHOD, AND REACTION SYSTEM AND REACTION DEVICE IMPLEMENTING SAME

CROSS REFERENCE TO RELATED APPLICATION

This Application is a 371 of PCT/JP2017/021893 filed on Jun. 14, 2017 which, in turn, claimed the priority of Japanese Patent Application No. 2016-122695 filed on Jun. 21, 2016, both applications are incorporated herein by reference.

TECHNICAL FIELD

The present invention relates to a reaction method of performing a predetermined reaction in a flow path by injecting liquid into the flow path and sucking liquid from the flow path multiple times using a pipette chip, and to a reaction system and a reaction apparatus that perform this method.

BACKGROUND ART

A biochemical reaction, such as an antigen-antibody reaction, is utilized for a biochemical examination For example, fluoroimmunoassays (hereinafter also called "FIAs") react a labeling substance that contains a fluorescent substance with a detection target substance (antigen). Subsequently, the detection target substance labeled with the labeling substance is irradiated with excitation light, and fluorescent light emitted from the fluorescent substance is detected. The amount of detection target substance is determined from the intensity of the detected fluorescent light or the like. Among such FIAs, a surface plasmon-field enhanced fluorescence spectroscopy (hereinafter also called "SPFS") has been known as a method capable of detecting a detection target substance specifically, highly sensitively.

The SPFS fixes, onto a metal film, first capturing bodies (e.g., primary antibodies) that can be specifically bonded to the detection target substance, thus forming a reaction field for capturing the detection target substance. Typically, the reaction field is formed in a micro flow path. Specimen liquid (specimen) containing the detection target substance is injected into the flow path, thereby bonding the detection target substance to the first capturing bodies (first-order reaction). Next, second capturing bodies (e.g., secondary antibodies) labeled with a fluorescent substance are injected into the flow path, thereby further bonding the second capturing bodies to the detection target substance bonded to the primary antibodies (second-order reaction). That is, the detection target substance is indirectly labeled with the fluorescent substance. In this state, irradiation of the metal film with excitation light excites the fluorescent substance with localized-field light enhanced by surface plasmon resonance (hereinafter also called "SPR") to emit fluorescent light. Detection of the fluorescent light emitted from the fluorescent substance can in turn detect the detection target substance.

In this case, when a specimen containing a significantly small amount of the detection target substance is used, the contact opportunity between the detection target substance and the first capturing bodies can be increased by feeding the specimen in the flow path in a reciprocating manner. Consequently, most of the detection target substance can be bonded to the first capturing bodies while preventing the detection target substance in the specimen from being lost. Preferably, washing liquid for washing the flow path, and the second capturing bodies are fed in a reciprocating manner likewise. However, as illustrated in FIG. 1A, possible occurrence of bubble 74 in flow path 44 covers first capturing bodies 70 with bubble 74, which sometimes prevents detection target substance 71 from being bonded to first capturing bodies 70 covered with bubble 74. Likewise, as illustrated in FIG. 1B, possible occurrence of bubble 74 in flow path 44 sometimes prevents second capturing bodies 72 from being bonded to detection target substance 71 covered with bubble 74. Possible presence of bubble 74 in flow path 44 during fluorescent light detection prevents the fluorescent light from being appropriately detected owing to the adverse effect of refraction.

In order to prevent such a bubble from occurring, adjustment of timing of liquid injection and suction during feeding of the liquid, such as the specimen, washing liquid and second antibodies, in the flow path in a reciprocating manner has been proposed (for example, see PTL 1). The invention described in PTL 1 adjusts liquid injecting and sucking timings during reciprocating liquid feeding so as to prevent the interface between the liquid and gas from passing the reaction field, except in a case of injecting the liquid into the vacant flow path and a case of removing the entire liquid from the flow path. Accordingly, bubbles are prevented from occurring at the reaction field and therearound.

Meanwhile, a technique is disclosed that detects the position of the distal end of a pipette chip using an optical non-contact sensor in an apparatus for dispensing liquid using a disposable pipette chip (for example, see PTL 2). It is described that the liquid in the vessel is sufficiently sucked into the pipette chip to reduce the remaining liquid amount by thus detecting the position of the distal end of the pipette chip and then sucking the liquid in the vessel using the pipette chip.

CITATION LIST

Patent Literature

PTL 1
WO2011/027851
PTL 2
Japanese Patent Application Laid-Open No. 2005-201882

SUMMARY OF INVENTION

Technical Problem

According to the invention described in PTL 1, as illustrated in FIG. 2A, liquid 73 is injected into flow path 44 and liquid 73 is sucked from flow path 44 using a pipette (pipette chip 135) fixed at a predetermined position in liquid injection section 45. When liquid 73 in flow path 44 is thus removed using pipette chip 135 fixed at a position where the bottom of liquid injection section 45 is not in contact therewith, liquid 73 slightly remains adjacent to the end of flow path 44 closer to pipette chip 135, as illustrated in FIG. 2B. In this state, pipette chip 135 having sucked liquid 73 therein is taken out, and pipette chip 135 retaining new liquid 73' is inserted to a predetermined position, which pushes residual liquid 73 into flow path 44 as illustrated in FIG. 2C. When new liquid 73' is injected from pipette chip 135 into flow path 44 as it is, bubble 74 occurs between liquid 73 remaining in flow path 44 and newly injected liquid 73', as illustrated in FIG. 2D. As described above, according to the presence of bubble 74 in flow path 44, there is a possibility that the reaction cannot appropriately be performed in flow path 44, and a possibility that the fluorescent light cannot appropriately be detected.

Even without occurrence of bubble 74, there is a possibility that liquid 73 remaining in flow path 44 immediately before the first-order reaction as illustrated in FIG. 2B reduces the concentration of the detection target substance in the specimen when the specimen is injected into liquid injection section 45, and degrades the quantitative capability of detection of the detection target substance. Likewise, there is a possibility that liquid 73 remaining in flow path 44 immediately before the second-order reaction reduces the concentration of the second capturing bodies in label liquid when the label liquid is injected into liquid injection section 45, and degrades the quantitative capability of detection of the detection target substance.

As a measure of reducing the amount of liquid 73 remaining in flow path 44 during sucking of liquid 73 from flow path 44, it is conceivable that liquid 73 is sucked in a state where pipette chip 135 is in contact with the bottom of liquid injection section 45 as illustrated in FIG. 2E. However, if pipette chip 135 is repetitively brought into contact with the bottom of liquid injection section 45, a load is applied to pipette chip 135 and a nozzle supporting this chip. Consequently, as illustrated in FIG. 2E, there is a possibility that pipette chip 135 is deformed, and the state of engagement between pipette chip 135 and the nozzle is changed, thereby preventing the position of the distal end of pipette chip 135 from being appropriately controlled. For example, even though the position of the distal end of pipette chip 135 is detected before sucking of liquid 73 from flow path 44 as described in PTL 2, there is a possibility that repetitive contact of pipette chip 135 with the bottom of liquid injection section 45 changes the position of the distal end of pipette chip 135, and liquid 73 cannot be appropriately sucked from flow path 44 in a latter half of a series of reaction steps.

An object of the present invention is to provide a reaction method of performing a predetermined reaction in a flow path by injecting liquid into the flow path and sucking liquid from the flow path multiple times using a pipette chip, the method capable of appropriately performing the reaction while suppressing the deformation and positional deviation of the pipette chip, and a reaction system and a reaction apparatus that perform this method.

Solution to Problem

A reaction method according to an embodiment of the present invention includes a reaction step of performing a predetermined reaction in a flow path by performing a liquid contact step multiple times, the liquid contact step including injection of liquid into the flow path and suction of liquid from the flow path by a pipette chip inserted through an opening section into a liquid injection section of a reaction chip including both the flow path and the liquid injection section, the liquid injection section communicating with one end of the flow path and having the opening section, in which in at least one liquid contact step while the liquid contact step is performed multiple times, a first suction is performed, in which first suction liquid is sucked in a state where the pipette chip and a bottom of the liquid injection section are in contact with or close to each other, and in at least one liquid contact step while the liquid contact step is performed multiple times, a second suction is performed, in which second suction liquid is sucked in a state where the pipette chip and a bottom of the liquid injection section are more apart from each other than in the state of the first suction.

A reaction system according to an embodiment of the present invention includes: a reaction chip including both a flow path and a liquid injection section, the liquid injection section communicating with one end of the flow path and having an opening section; a pipette configured to inject liquid into the liquid injection section and suck the liquid from the liquid injection section, the pipette having a pipette chip mounted thereon; and a pipette controller configured to control the pipette, in which the pipette controller causes the pipette to perform injection of the liquid into the flow path and suction of the liquid from the flow path multiple times in a state where the pipette chip is inserted into the liquid injection section through the opening section, in at least one suction of the liquid while the suction of the liquid is performed multiple times, the pipette controller causes the pipette to perform a first suction, in which first suction liquid is sucked in a state where the pipette chip and a bottom of the liquid injection section are in contact with or close to each other, and in at least one suction of the liquid while the suction of the liquid is performed multiple times, the pipette controller causes the pipette to perform a second suction, in which second suction liquid is sucked in a state where the pipette chip and the bottom of the liquid injection section are more apart from each other than in the first sucking.

A reaction apparatus according to an embodiment of the present invention includes: a chip holder configured to hold a reaction chip including both a flow path and a liquid injection section communicating with one end of the flow path and having an opening section; a pipette on which a pipette chip can be mounted, the pipette being used to inject liquid into the liquid injection section of the reaction chip held by the chip holder, and to suck the liquid from the liquid injection section; and a pipette controller configured to control the pipette, in which the pipette controller causes the pipette to perform injection of the liquid into the flow path and suction of the liquid from the flow path multiple times in a state where the pipette chip is inserted through the opening section into the liquid injection section of the reaction chip held by the chip holder, in at least one suction of the liquid while the suction of the liquid is performed multiple times, the pipette controller causes the pipette to perform a first suction, in which first suction liquid is sucked in a state where the pipette chip and a bottom of the liquid injection section are in contact with or close to each other, and in at least one suction of the liquid while the suction of the liquid is performed multiple times, the pipette controller causes the pipette to perform a second suction, in which second suction liquid is sucked in a state where the pipette chip and the bottom of the liquid injection section are more apart from each other than in the first sucking.

Advantageous Effects of Invention

The present invention can provide a reaction method of appropriately performing the reaction while suppressing the deformation and positional deviation of the pipette chip, and the reaction system and the reaction apparatus that perform this method.

BRIEF DESCRIPTION OF DRAWINGS

FIGS. 6A to 6D schematically illustrate a reaction method according to one embodiment of the present invention.

DESCRIPTION OF EMBODIMENTS

Hereinafter, embodiments of the present invention are described in detail with reference to the accompanying drawings. Hereinafter, an SPFS apparatus that can execute the reaction method according to one embodiment of the present invention is described as a typical example of the reaction system and the reaction apparatus according to the present invention. However, the reaction system and the reaction apparatus according to the present invention are not limited thereto. In the following description, the SPFS apparatus in a state where a reaction chip and a pipette chip are mounted corresponds to the reaction system according to one embodiment of the present invention. The SPFS apparatus in a state where no reaction chip and no pipette chip are mounted corresponds to the detection apparatus according to one embodiment of the present invention.

Figure 1A:
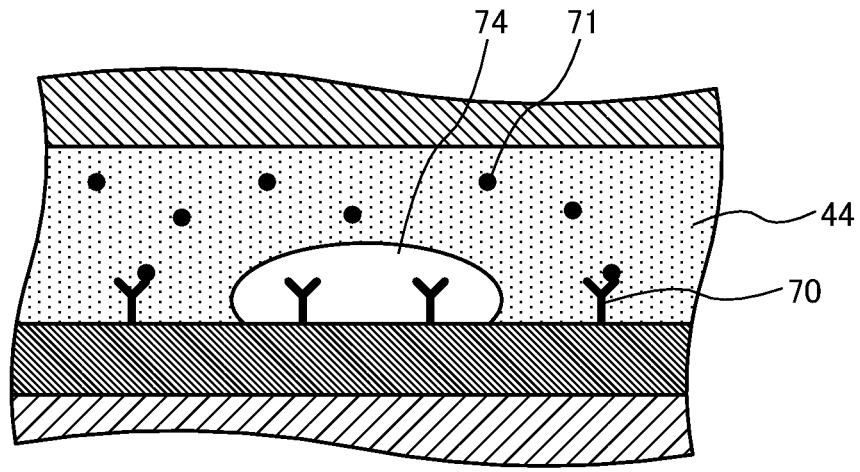
FIGS. 1A and 1B schematically illustrate adverse effects of a bubble.
Figure 1B:
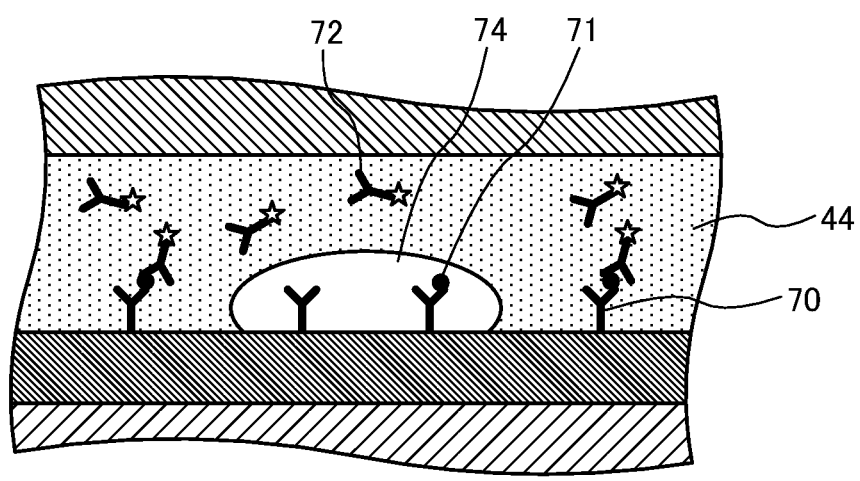
Figure 2A:
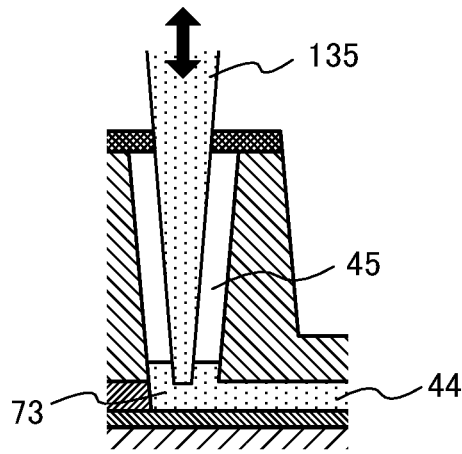
FIGS. 2A to 2F schematically illustrate a problem of a conventional liquid feeding method.
Figure 2B:
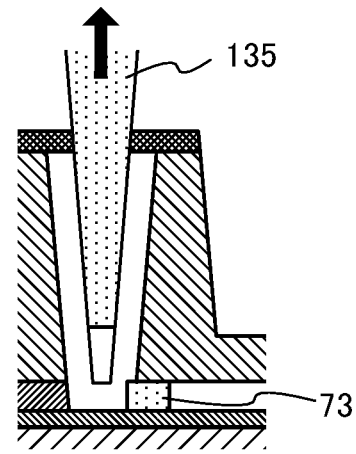
Figure 2C:
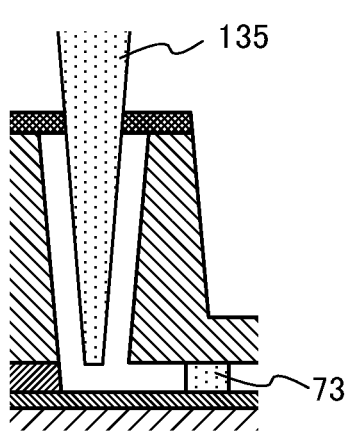
Figure 2D:
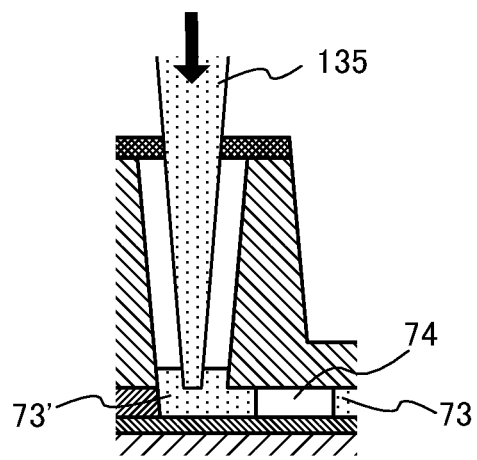
Figure 2E:
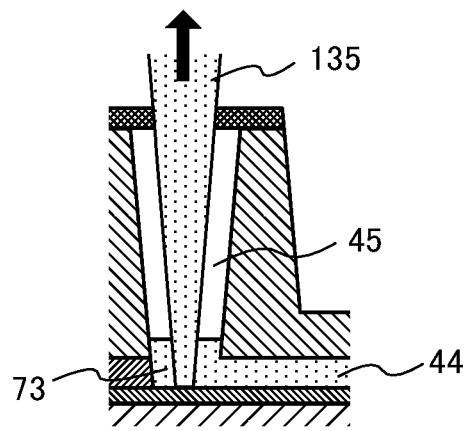
Figure 2F:
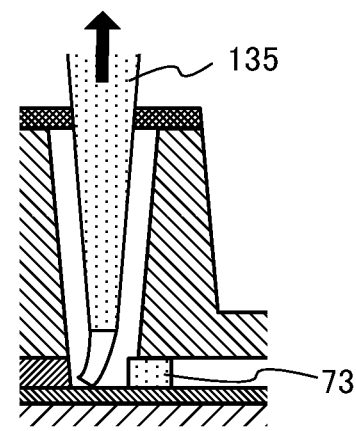
Figure 3:
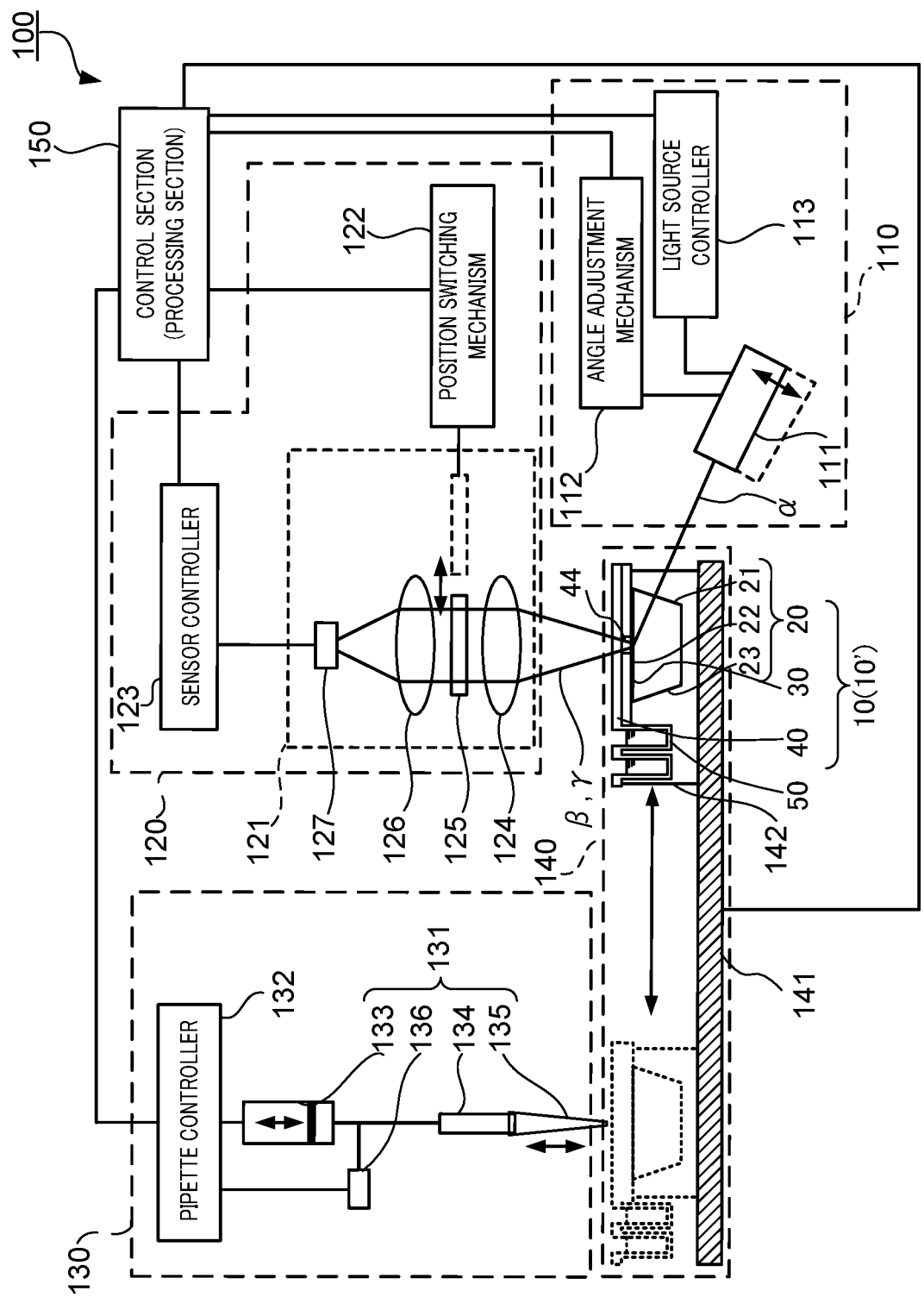
FIG. 3 schematically illustrates a configuration of a reaction apparatus (SPFS apparatus) according to one embodiment of the present invention.

FIG. 3 schematically illustrate a configuration of SPFS apparatus 100 according to one embodiment of the present invention. As illustrated in FIG. 3, SPFS apparatus 100 includes an excitation light irradiation unit 110, fluorescent light detection unit 120, liquid feeding unit 130, conveyance unit 140, and control section 150. In a state where reaction chip 10 is mounted on chip holder 142 of conveyance unit 140, SPFS apparatus 100 irradiates metal film 30 of reaction chip 10 with excitation light α so as to cause surface plasmon resonance, and cause localized-field light based on the surface plasmon resonance. The fluorescent substance residing on metal film 30 is excited with the localized-field light, and fluorescent light β emitted from the fluorescent substance is detected, thereby measuring the presence or absence and the amount of a detection target substance in a specimen. In this embodiment, reaction chip 10 is integrated together with liquid chip 50, and is detachably mounted on chip holder 142 of SPFS apparatus 100. Pipette chip 135 is detachably mounted on nozzle unit 134 of SPFS apparatus 100.

Hereinafter, first, reaction chip 10 and SPFS apparatus 100 (the reaction system and the reaction apparatus) are described, and subsequently a method of feeding various types of liquid in reaction chip 10 and performing a predetermined reaction (reaction method), and a method of detecting a detection target substance using SPFS apparatus 100 are described.

(Reaction Chip)

As illustrated in FIG. 3, reaction chip 10 includes: prism 20 that includes light incident surface 21, film-formed surface 22 and light emission surface 23; metal film 30 formed on film-formed surface 22 of prism 20; and flow path cover 40 disposed on film-formed surface 22 of prism 20 or metal film 30. As described below, reaction chip 10 further includes: flow path 44; liquid injection section 45 that communicates with one end of flow path 44; and reservoir section 46 that communicates with the other end of flow path 44. In this embodiment, flow path cover 40 adheres to metal film 30 (or prism 20) with adhesive layer 60, such as double-faced adhesive tape. Adhesive layer 60 also has a role of defining the side shape of flow path 44. Flow path cover 40 may be joined to metal film 30 (or prism 20) of reaction chip 10 by laser welding, ultrasonic welding, pressure bonding using a clamp member or the like without using adhesive layer 60. In this case, the side shape of flow path 44 is defined by flow path cover 40. In this embodiment, reaction chip 10 is integrated together with liquid chip 50.

Prism 20 is made of a dielectric material that is transparent for excitation light α, and includes light incident surface 21, film-formed surface 22, and light emission surface 23, as illustrated in FIG. 3. Light incident surface 21 is a surface for allowing the excitation light α from excitation light irradiation unit 110 to enter the inside of prism 20. Metal film 30 is disposed on film-formed surface 22. Excitation light α having entered the inside of prism 20 is reflected by the rear surface of metal film 30, more specifically, the interface (film-formed surface 22) between prism 20 and metal film 30. Meanwhile, light emission surface 23 is a surface for emitting the reflected light reflected by film-formed surface 22 to the outside of prism 20.

The shape of prism 20 is not specifically limited. In this embodiment, the shape of prism 20 is a prismatic body whose base surface is a trapezoid. A surface corresponding to one base of the trapezoid is film-formed surface 22, a surface corresponding to one leg is light incident surface 21, and a surface corresponding to the other leg is light emission surface 23. Preferably, the trapezoid serving as the base surface is an isosceles trapezoid. Accordingly, light incident surface 21 and light emission surface 23 are symmetrical, and the s-polarized component of excitation light α becomes less likely to stay in prism 20.

Light incident surface 21 is formed such that excitation light α cannot return to excitation light irradiation unit 110. In a case where the light source of excitation light α is a laser diode (hereinafter also called "LD"), if light α returns to LD, the excited state is disturbed, and the wavelength and output of excitation light α vary. In a scan range centered on an ideal resonance angle or enhancement angle, light incident surface 21 is set to have an angle of preventing excitation light α from perpendicularly entering light incident surface 21. Here, the "resonance angle" means an incident angle with the light intensity of the reflected light emitted from light emission surface 23 being the minimum when the incident angle of excitation light α on metal film 30 is swept. The "enhancement angle" means an incident angle with the light intensity of scattered light (hereinafter called "plasmon scattered light") γ being the maximum when the incident angle of excitation light α on metal film 30 is swept; the plasmon scattered light has the same wavelength as excitation light α and is emitted above reaction chip 10. In this embodiment, the angle between light incident surface 21 and film-formed surface 22, and the angle between film-formed surface 22 and light emission surface 23 are each about 80°.

The design of reaction chip 10 roughly determines the resonance angle (and the enhancement angle significantly adjacent thereto). Design elements include the refraction index of prism 20, the refraction index of metal film 30, the film thickness of metal film 30, the extinction coefficient of metal film 30, the wavelength of excitation light a and the like. The resonance angle and enhancement angle are shifted by the detection target substance captured on metal film 30 via the first capturing bodies. The shifted amount is less than several degrees.

Prism 20 has a certain amount of birefringent property. Examples of the material of prism 20 include resin and glass. Preferably, the material of prism 20 is a resin that has a refraction index ranging from 1.4 to 1.6 and a small amount of birefringent property.

Metal film 30 is disposed on film-formed surface 22 of prism 20. Accordingly, an interaction (SPR) occurs between photons of excitation light a entering film-formed surface 22 with a total reflection condition and free electrons in metal film 30, and localized-field light (typically, "evanescent light" or "near-field light") occurs on the surface of metal film 30.

The material of metal film 30 is not specifically limited. Any metal may be adopted only if the metal can cause the surface plasmon resonance. Examples of the material of metal film 30 include gold, silver, copper, aluminum, and alloys of these metals. A method of forming metal film 30 is not specifically limited. Examples of the method of forming metal film 30 include sputtering, and vapor deposition, and plating. The thickness of metal film 30 is not specifically limited. It is however preferable that the thickness be in a range from 30 to 70 nm.

Figure 4:
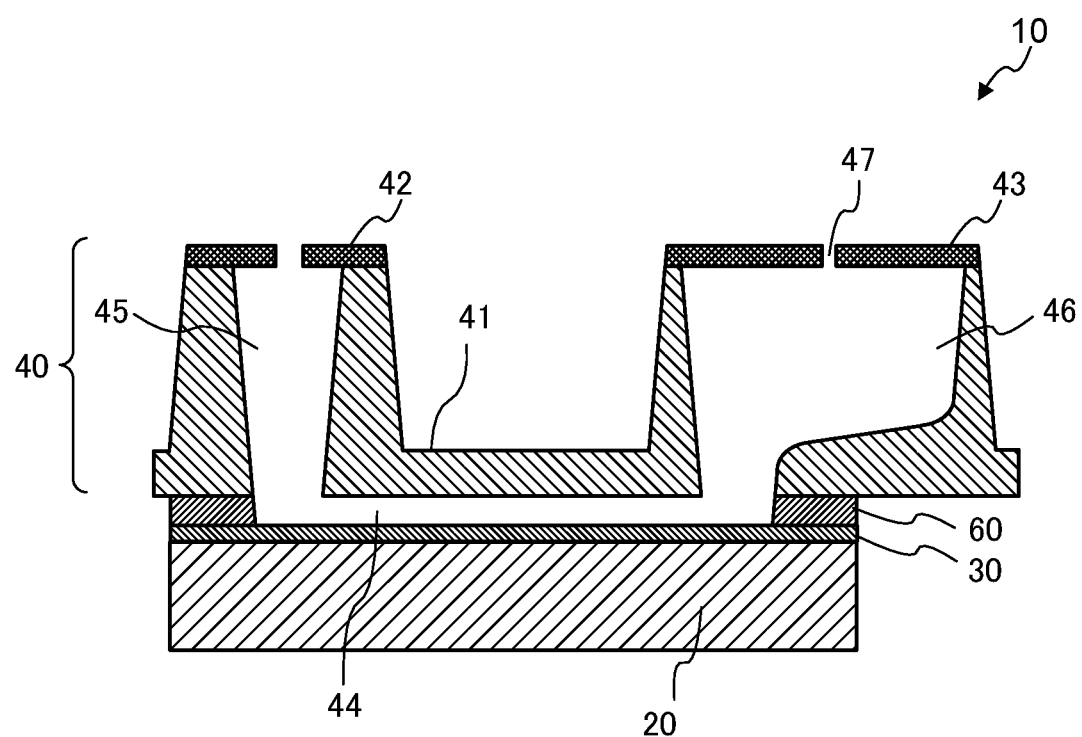
FIG. 4 is a sectional view of a reaction chip.

FIG. 4 is a sectional view of reaction chip 10 viewed in a direction different from that in FIG. 3. As illustrated in FIG. 4, flow path cover 40 includes frame 41, liquid injection section cover film 42, and reservoir section cover film 43. Two through-holes are formed in frame 41. One opening section of one through-hole is blocked with metal film 30 (or prism 20), and the other opening is blocked with liquid injection section cover film 42, thereby allowing the through-hole to function as liquid injection section 45. One opening section of the other through-hole is blocked with metal film 30 (or prism 20), and the other opening is blocked with reservoir section cover film 43, thereby allowing the through-hole to function as reservoir section 46. Reservoir section cover film 43 is provided with ventilation hole 47.

As described above, in this embodiment, flow path cover 40 (frame 41) adheres to metal film 30 (or prism 20) with adhesive layer 60, such as double-faced adhesive tape. Adhesive layer 60 also has a role of defining the side shape of flow path 44. That is, adhesive layer 60 is provided with a narrowly shaped through-hole. The one opening section of the through-hole is blocked with metal film 30 (or prism 20), and the other opening section is blocked with frame 41. Accordingly, flow path 44 is formed where the one end is open to liquid injection section 45 and the other end is open to reservoir section 46. In the case where flow path cover 40 is joined to metal film 30 (or prism 20) without using adhesive layer 60, a groove is formed on a surface of frame 41 that is closer to metal film 30 and defines the shape of flow path 44. In this case, the opening section of the groove is blocked with metal film 30 (or prism 20), thereby forming flow path 44 whose one end is open to liquid injection section 45 and whose other end is open to reservoir section 46.

Frame 41 is formed of a material that is transparent for light (e.g., fluorescent light β and plasmon scattered light γ).

Note that a part of frame 41 may be formed of a material that is non-transparent for the light only if the material does not prevent the light from being taken by a detection method described later. Examples of the material transparent for the light include resins.

Liquid injection section cover film 42 is a film that allows pipette chip 135 to be inserted, and when pipette chip 135 is inserted, the film can be in close contact with the outer periphery of pipette chip 135 without any gap. For example, liquid injection section cover film 42 is a two-layer film made up of a flexible film and an adhesive film. Liquid injection section cover film 42 may be provided with a micro through-hole for allowing pipette chip 135 to be inserted thereinto. In this embodiment, liquid injection section cover film 42 is provided with a through-hole having an external diameter of 1.2 mm.

Any type of the flexible film may be adopted only if the film can be in close contact with the outer periphery of pipette chip 135 after insertion of pipette chip 135. For example, the flexible film is a polyurethane film that has a tensile elastic modulus ranging from 0.05 to 2 GPa, a tensile rupture elongation ranging from 200 to 2000%, and a tear strength ranging 80 to 3000 mN. Other examples of the flexible film include low-density polyethylene (LDPE), linear low-density polyethylene (LLDPE), medium-density polyethylene (HDPE), nylon, non-oriented polypropylene (CPP), ethylene-vinylalcohol copolymer (EVOH), silicone, polyvinyl alcohol (PVA), polyvinyl chloride (PVC) and the like. The thickness of the flexible film is not specifically limited, and is about 100 μm, for example. The type of the adhesive film is not specifically limited only if this film can fix the flexible film and frame 41.

As described above, reservoir section cover film 43 has ventilation hole 47. The configuration of reservoir section cover film 43 is not specifically limited. For example, reservoir section cover film 43 may be a two-layer film similar to liquid injection section cover film 42 described above.

The first capturing bodies are fixed onto metal film 30 exposed in flow path 44. The first capturing body is a substance that has a recognition site to be specifically bonded to the detection target substance in the specimen.

In the case where the first capturing bodies are fixed in flow path 44, the detection target substance is selectively bonded to the first capturing bodies when the specimen is fed into flow path 44. That is, a region where the first capturing bodies are fixed serves as a reaction field. The detection target substance is captured in the reaction field. As described later, in this reaction field, a reaction of labeling, with a fluorescent substance, the detection target substance captured by the first capturing bodies is also performed. The detection target substance can be detected by detecting fluorescent light emitted from the fluorescent substance. The type of the first capturing body is not specifically limited only if the body has a recognition site for specifically bonded to the detection target substance. Examples of the first capturing bodies include antibodies (primary antibodies) or their fragments that can be specifically bonded to the detection target substance, enzymes that can specifically bonded to the detection target substance and the like. The width and height of flow path 44 are not specifically limited, and are appropriately selected in conformity with the usage of reaction chip 10.

As shown in FIGS. 6A to 6D, pipette chip 135 is inserted into liquid injection section 45. Here, the opening section (the through-hole provided in liquid injection section cover film 42) of liquid injection section 45 is in contact with the outer periphery of pipette chip 135 without any gap. Accordingly, by injecting the liquid from pipette chip 135 into liquid injection section 45, the liquid can be introduced into flow path 44. By sucking the liquid residing in liquid injection section 45 into pipette chip 135, the liquid in flow path 44 can be removed. By alternately injecting and sucking the liquid, the liquid can be fed in flow path 44 in a reciprocating manner. The shape and volume of liquid injection section 45 are appropriately selected in conformity with the shape and the like of pipette chip 135.

When an amount of liquid exceeding the volume of flow path 44 is introduced from liquid injection section 45 into flow path 44, the liquid flows from flow path 44 into reservoir section 46. Also when the liquid is fed in flow path 44 in a reciprocating manner, the liquid flows into reservoir section 46. The liquid flowed into reservoir section 46 is stirred in reservoir section 46. When the liquid is stirred in reservoir section 46, the concentrations of components (e.g., the detection target substance, cleaning components, etc.) of the liquid (the specimen and washing liquid) passing through flow path 44 becomes uniform, and various reactions are facilitated in flow path 44, and the washing effect is improved. The shape and volume of reservoir section 46 are not specifically limited only if the liquid can be sufficiently retained during reciprocating liquid feeding.

As described above, in this embodiment, reaction chip 10 and liquid chip 50 are integrated together (see FIG. 3). Liquid chip 50 includes multiple wells that contain respective types of liquid, such as a specimen, label liquid, washing liquid, and buffer solution for measurement. The opening sections of these wells may be blocked with film or the like in a state of containing the liquid. The film, with which the opening sections of the wells are blocked, may be removed by a user before using liquid chip 50. In a case where pipette chip 135 can penetrate the film, liquid chip 50 may be used in a state where the opening sections of the wells are blocked with the film.

Typically, reaction chip 10 and liquid chip 50 are replaced at every measurement. Preferably, reaction chip 10 is a structural body with sides each having a length ranging from several millimeters to several centimeters. Alternatively, this chip may be a smaller structural body or a larger structural body that are not classified into "chip".

(SPFS Apparatus)

Next, the configuration elements of SPFS apparatus 100 other than reaction chip 10 are described. As described above, SPFS apparatus 100 includes excitation light irradiation unit 110, fluorescent light detection unit 120, liquid feeding unit 130, conveyance unit 140, and control section 150.

Excitation light irradiation unit 110 irradiates reaction chip 10 held by chip holder 142 with excitation light $\alpha$. During measurement of fluorescent light $\beta$ or plasmon scattered light $\gamma$, excitation light irradiation unit 110 emits only the p-polarized wave for metal film 30 toward light incident surface 21 such that the incident angle to metal film 30 can be an angle for causing SPR. Here, "excitation light" is light that directly or indirectly excites the fluorescent substance. For example, excitation light $\alpha$ is light that causes localized-field light for exciting the fluorescent substance, on the surface of metal film 30, when being emitted through prism 20 at an angle causing SPR on metal film 30. Excitation light irradiation unit 110 includes light source unit 111, angle adjustment mechanism 112, and light source controller 113.

Light source unit 111 emits collimated excitation light $\alpha$ having a constant wavelength and light intensity such that an irradiation spot on the rear surface of metal film 30 can have a substantially circular shape. Light source unit 111 includes, for example, a light source of excitation light $\alpha$, a beam shaping optical system, an APC mechanism, and a temperature adjustment mechanism, each of which is not illustrated.

The type of the light source is not specifically limited, and is a laser diode (LD), for example. Other examples of the light source include a light-emitting diode, a mercury lamp, and other laser light sources. In a case where the light emitted from the light source is not a beam, the light emitted from the light source is transformed into a beam by lenses, mirrors, a slit and the like. In a case where the light emitted from the light source is not monochromatic light, the light emitted from the light source is transformed into monochromatic light by a diffraction grating and the like. In a case where the light emitted from the light source is not linearly polarized light, the light emitted from the light source is transformed into linearly polarized light by a polarizer and the like.

The beam shaping optical system includes, for example, a collimator, a band-pass filter, a linearly polarizing filter, a half-wave plate, a slit, a zoom section and the like. The beam shaping optical system may include all or some of these components. The collimator collimates excitation light $\alpha$ emitted from the light source.

The band-pass filter transforms excitation light $\alpha$ emitted from the light source into narrow-band light only having a center wavelength. This is because excitation light $\alpha$ from the light source has a slight wavelength distribution width. The linearly polarizing filter transforms excitation light $\alpha$ emitted from the light source into completely linearly polarized light. The half-wave plate adjusts the polarization direction of excitation light $\alpha$ such that the p-polarized component can enter metal film 30. The slit and the zoom section adjusts the beam width and the contour shape of the excitation light $\alpha$ such that the shape of the irradiation spot on the rear surface of metal film 30 can be a circle having a predetermined size.

The APC mechanism controls the light source so as to have a constant output. More specifically, the APC mechanism detects the intensity of the light branched off from excitation light $\alpha$ using a photodiode or the like, not illustrated. The APC mechanism controls the light source to have a constant output by controlling the input energy through a recurrent circuit.

The temperature adjustment mechanism may be, for example, a heater, Peltier element or the like. The wavelength and energy of the emitted light from the light source sometimes vary according to the temperature. Consequently, the wavelength and energy of the emitted light from the light source are controlled to be constant by maintaining the temperature of the light source constant by the temperature adjustment mechanism.

Angle adjustment mechanism 112 adjusts the incident angle of excitation light $\alpha$ to metal film 30 (the interface (film-formed surface 22) between prism 20 and metal film 30). Angle adjustment mechanism 112 relatively rotates the optical axis of excitation light $\alpha$ and chip holder 142 in order to emit excitation light $\alpha$ at a predetermined incident angle through prism 20 toward a predetermined position on metal film 30.

For example, angle adjustment mechanism 112 rotates light source unit 111 centered on the axis (the axis perpendicular to the sheet of FIG. 3) orthogonal to the optical axis of excitation light $\alpha$. Here, the position of the rotation axis is set such that the position of the irradiation spot can be almost unchanged on metal film 30 even when the incident angle is swept. The position of the rotation center is set adjacent to the intersection of the two optical axes of excitation light α at the opposite ends of the scan range of the incident angle (between the irradiation position on film-formed surface 22 and light incident surface 21), thereby allowing the deviation of the irradiation position to be the minimum.

As described above, the incident angle of excitation light α to metal film 30 that allows the light intensity of plasmon scattered light γ to be the maximum is the enhancement angle. The incident angle of excitation light α is set to the enhancement angle or its adjacent angle, thereby allowing fluorescent light β having a high intensity to be measured. The basic incident condition of excitation light α is determined by the material and shape of prism 20 of reaction chip 10, the film thickness of metal film 30, the refraction index of liquid in flow path 44 and the like. The optimal incident condition is slightly changed by the type and amount of the fluorescent substance in flow path 44, the shape error of prism 20 and the like. Accordingly, it is preferable to obtain the optimal enhancement angle for each measurement.

Light source controller 113 controls the emission of excitation light α from light source unit 111 by controlling various devices included in light source unit 111. Light source controller 113 is made up of a publicly known computer or microcomputer that includes, an operation device, a control device, a storage device, an input device, and an output device, for example.

Fluorescent light detection unit 120 detects fluorescent light β caused by irradiating metal film 30 with excitation light α. If necessary, fluorescent light detection unit 120 also detects plasmon scattered light γ caused by irradiating metal film 30 with excitation light α. Fluorescent light detection unit 120 includes light receiving unit 121, position switching mechanism 122, and sensor controller 123.

Light receiving unit 121 is disposed in the direction of the normal of metal film 30 of reaction chip 10. Light receiving unit 121 includes first lens 124, optical filter 125, second lens 126, and light receiving sensor 127.

First lens 124 is, for example, a condenser lens, and condenses the light emitted from metal film 30. Second lens 126 is, for example, an imaging lens, and forms an image of the light condensed by first lens 124, on the light receiving surface of light receiving sensor 127. The optical path between the lenses is a substantially parallel optical path. Optical filter 125 is disposed between the lenses.

Optical filter 125 guides only the fluorescent light component to light receiving sensor 127, and removes the excitation light component (plasmon scattered light γ) in order to detect fluorescent light β at a high S (signal)/N (noise). Examples of optical filter 125 include an excitation light reflecting filter, a short-wavelength cut filter, and a band-pass filter. Optical filter 125 is, for example, a filter that includes a multi-layer film for reflecting a predetermined optical component, or a color glass filter that absorbs a predetermined optical component.

Light receiving sensor 127 detects fluorescent light β and plasmon scattered light γ. Light receiving sensor 127 has a high sensitivity that allows faint fluorescent light β from a significantly small amount of the detection target substance to be detected. Light receiving sensor 127 is, for example, a photomultiplier tube (PMT) or an avalanche photodiode (APD) or the like.

Position switching mechanism 122 switches the position of optical filter 125 to the optical path in light receiving unit 121 or the outside of the optical path. More specifically, when light receiving sensor 127 detects fluorescent light β, optical filter 125 is disposed on the optical path of light receiving unit 121. When light receiving sensor 127 detects plasmon scattered light γ, optical filter 125 is disposed outside of the optical path of optical filter 125.

Sensor controller 123 controls to detect the output value of light receiving sensor 127, manage the sensitivity of light receiving sensor 127 according to the detected output value, and change the sensitivity of light receiving sensor 127 for obtaining an appropriate output value. Sensor controller 123 is made up of a publicly known computer or microcomputer that includes, an operation device, a control device, a storage device, an input device, and an output device, for example.

Liquid feeding unit 130 injects various types of liquid into liquid injection section 45 of reaction chip 10 held by chip holder 142, and guides the liquid into flow path 44. Liquid feeding unit 130 sucks various types of liquid from liquid injection section 45 of reaction chip 10 held by chip holder 142, and removes the liquid in flow path 44. Liquid feeding unit 130 alternately repeats liquid injection into liquid injection section 45 and liquid sucking from liquid injection section 45, thereby feeding the liquid in flow path 44 in a reciprocating manner. In this embodiment, liquid feeding unit 130 injects and sucks, for example, the specimen, label liquid including the second capturing bodies labeled with the fluorescent substance, washing liquid, buffer solution for measurement used during fluorescent light measurement, and the like. As described above, the predetermined reaction is performed in flow path 44 by performing a liquid contact step of injecting liquid into flow path 44 and sucking liquid from flow path 44 multiple times. In this specification, a series of steps of achieving a predetermined result in flow path 44 by performing the liquid contact step multiple times as described above is also called "reaction step".

Liquid feeding unit 130 includes pipette 131, and pipette controller 132.

Pipette 131 includes syringe pump 133, nozzle unit 134 that communicates with syringe pump 133, pipette chip 135 mounted on the distal end of nozzle unit 134, and pressure sensor 136 connected between syringe pump 133 and nozzle unit 134. Reciprocating movement of a plunger in syringe pump 133 quantitatively sucks and discharges the liquid in pipette chip 135. Pressure sensor 136 detects the pressure in pipette chip 135.

In this embodiment, when pipette chip 135 is inserted into liquid injection section 45 of reaction chip 10, the opening section of liquid injection section 45 (the through-hole provided in liquid injection section cover film 42) and the outer periphery of pipette chip 135 are required to be in contact with each other without any gap. It is preferable that a region of pipette chip 135 in contact with liquid injection section cover film 42 of reaction chip 10 have a constant external diameter, and it is preferable that the region have a cylindrical shape. A region that is not in contact with liquid injection section cover film 42 does not necessarily have a constant external diameter, and may have any shape. If even with movement of pipette chip 135 by about several hundred micrometers in the vertical direction (axial direction of pipette chip 135), no gap occurs between the opening section of liquid injection section 45 (the through-hole provided in liquid injection section cover film 42) and the outer periphery of pipette chip 135, the external shape of pipette chip 135 is not specifically limited and may be a truncated cone, for example.

The material of pipette chip 135 is not specifically limited. Typically, pipette chip 135 is a disposable pipette chip made of a resin. Such pipette chip 135 made of the resin is sometimes deformed and the fitting state with nozzle unit 134 is sometimes changed by repetitive application of a heavy load thereto.

Pipette controller 132 includes a drive device for syringe pump 133, and a movement device for pipette chip 135. The drive device for syringe pump 133 is a device for moving the plunger of syringe pump 133 in a reciprocating manner, and includes a stepper motor, for example. The drive that includes the stepper motor can manage the liquid feeding amount and the liquid feeding rate. Consequently, this is preferable in view of management of the remaining liquid amount in reaction chip 10. The movement device of pipette chip 135 freely moves nozzle unit 134 in the axial direction (e.g., the vertical direction) of pipette chip 135, for example. The movement device of pipette chip 135 includes, for example, a drive device including a stepper motor, a robot arm, a two-axis stage, or a freely vertically movable turntable.

Pipette controller 132 drives syringe pump 133 to suck various types of liquid from liquid chip 50 into pipette chip 135. Pipette controller 132 then moves pipette chip 135 to insert pipette chip 135 through the opening section (the through-hole provided in liquid injection section cover film 42) into liquid injection section 45 of reaction chip 10, and drives syringe pump 133 to inject the liquid residing in pipette chip 135 into liquid injection section 45. After supplying the liquid, pipette controller 132 drives syringe pump 133 to suck the liquid residing in liquid injection section 45 into pipette chip 135. Pipette controller 132 drives syringe pump 133 to repeat liquid injection and liquid sucking alternately to feed the liquid in flow path 44 in a reciprocating manner. Such liquid feeding in the reciprocating manner washes the inside of flow path 44, reacts the first capturing bodies and the detection target substance in flow path 44 (first-order reaction), and reacts the detection target substance and the second capturing bodies labeled with the fluorescent substance (second-order reaction). To remove the liquid from flow path 44, pipette controller 132 sucks the liquid in liquid injection section 45 into pipette chip 135. As described later, to prevent pipette chip 135 from being deformed and from positionally deviating, pipette controller 132 adjusts the position of the distal end of pipette chip 135 during removal of the liquid in flow path 44, according to the details of a step to be subsequently executed.

Pipette controller 132 detects the pressure in pipette chip 135 during suction of the liquid or gas into pipette chip 135 using pressure sensor 136, thereby identifying the position of the distal end of pipette chip 135 with reference to the bottom of liquid injection section 45.

Conveyance unit 140 conveys reaction chip 10 and liquid chip 50 to a measurement position or a liquid feeding position, and fixes the chips thereto. Here, the "measurement position" is a position where excitation light irradiation unit 110 irradiates reaction chip 10 with excitation light α, and fluorescent light detection unit 120 detects fluorescent light β or plasmon scattered light γ caused by the irradiation. The "liquid feeding position" is a position where liquid feeding unit 130 sucks the liquid in the wells of liquid chip 50, injects the liquid into liquid injection section 45 of reaction chip 10, or sucks the liquid in flow path 44 of reaction chip 10 from liquid injection section 45. Conveyance unit 140 includes conveyance stage 141, and chip holder 142. Chip holder 142 is fixed to conveyance stage 141, and detachably holds reaction chip 10 and liquid chip 50. The shape of chip holder 142 is a shape that can hold reaction chip 10 and liquid chip 50 and does not interfere with the optical paths of excitation light α, fluorescent light β and plasmon scattered light γ. For example, chip holder 142 is provided with an opening for allowing excitation light α, fluorescent light β and plasmon scattered light γ to pass therethrough. Conveyance stage 141 moves chip holder 142 in one direction and the reverse direction. Conveyance stage 141 also has a shape that does not interfere with the optical paths of excitation light α, fluorescent light β and plasmon scattered light γ. Conveyance stage 141 is driven by a stepper motor or the like, for example.

Control section 150 controls angle adjustment mechanism 112, light source controller 113, position switching mechanism 122, sensor controller 123, pipette controller 132, and conveyance stage 141. Control section 150 is made up of a publicly known computer or microcomputer that includes, an operation device, a control device, a storage device, an input device, and an output device, for example.

(Detection Method)

Figure 5:
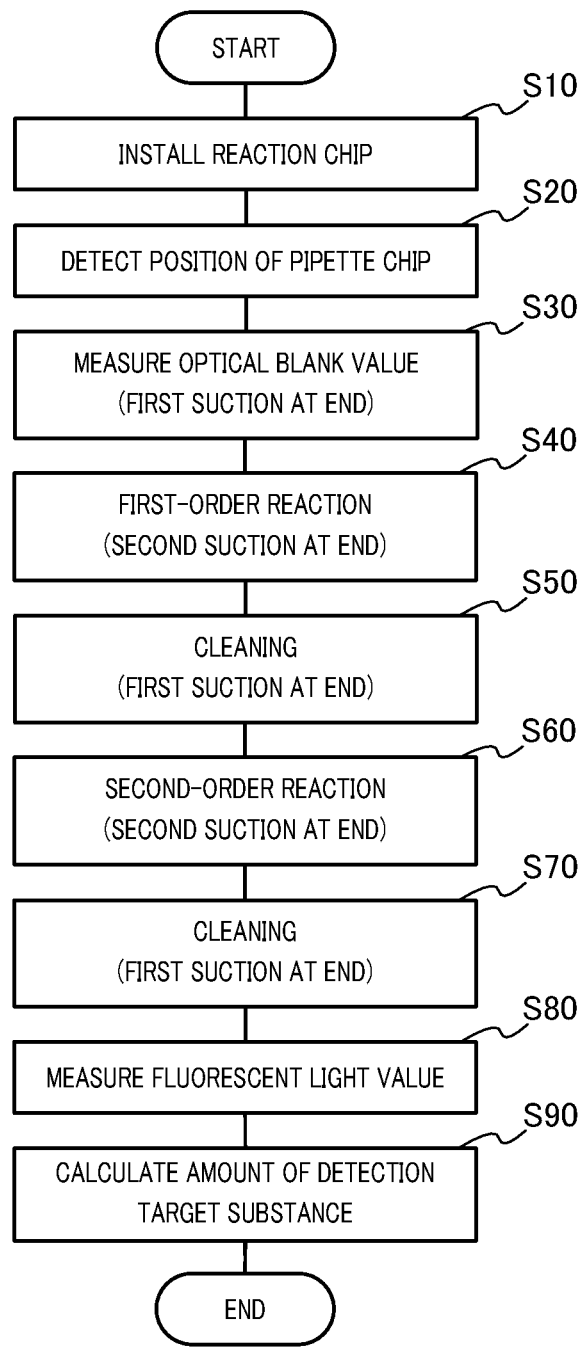
FIG. 5 is a flowchart of a detection method (reaction method) according to one embodiment of the present invention, and is a flowchart illustrating one example of operation procedures of a reaction apparatus (SPFS apparatus).

Next, a method of detecting the detection target substance using SPFS apparatus 100 (the reaction apparatus, and the reaction system) is described. FIG. 5 is a flowchart illustrating an example of the operation procedures of SPFS apparatus 100 in a case where the detection method in this embodiment is performed. First-half steps of feeding various types of liquid into flow path 44 of reaction chip 10 and of causing a state where the detection target substance labelled with the fluorescent substance is captured in the reaction field (steps S30 to S70) correspond to the reaction method according to one embodiment of the present invention. FIGS. 6A to 6D schematically illustrate the reaction method according to this embodiment.

First, reaction chip 10 described above is installed in chip holder 142 of SPFS apparatus 100 (step S10).

Next, the position of the distal end of pipette chip 135 is detected (step S20). Specifically, the contact state between pipette chip 135 and the bottom of liquid injection section 45 is detected on the basis of the pressure in pipette chip 135 during suction of gas into pipette chip 135, and the position of pipette chip 135 with reference to the bottom of liquid injection section 45 is identified.

Figure 7A:
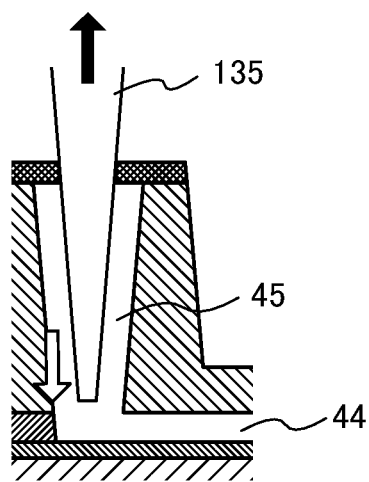
FIGS. 7A to 7D schematically illustrate a step of detecting the position of the distal end of a pipette chip.
Figure 7B:
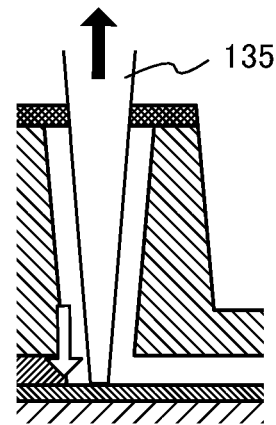
Figure 8:
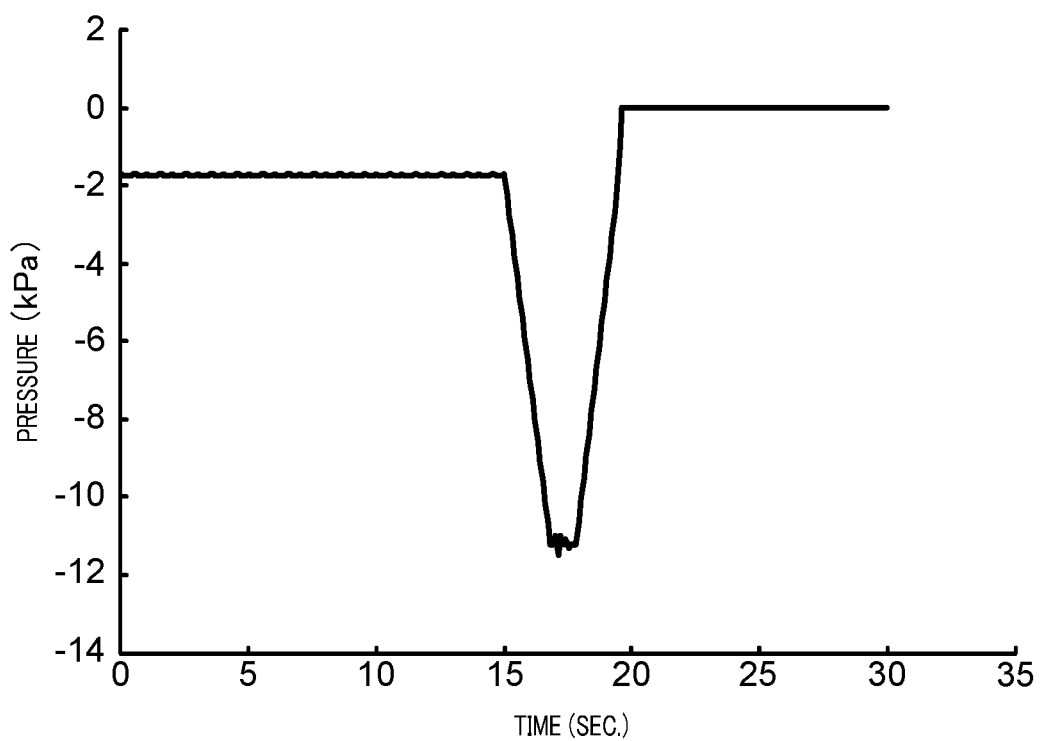
FIG. 8 is a graph illustrating temporary change in pressure in a pipette chip.

For example, as illustrated in FIGS. 7A and 7B, the gas in liquid injection section 45 may be sucked into pipette chip 135 while pipette chip 135 is moved toward the bottom of liquid injection section 45. At this time, the pressure in pipette chip 135 is detected by pressure sensor 136. Accordingly, as illustrated in FIG. 8, the degree of the negative pressure in pipette chip 135 significantly increases when the distal end of pipette chip 135 comes into contact with the bottom of liquid injection section 45 or immediately before the contact. Consequently, the position of the distal end of pipette chip 135 in the case where the degree of the negative pressure in pipette chip 135 significantly increases can be determined as the position of the bottom of liquid injection section 45. In the graph of FIG. 8, suction is stopped after significant increase in the degree of the negative pressure.

More specifically, first, based on preliminarily held rough information, pipette chip 135 (nozzle unit 134) is moved so as to position the distal end of pipette chip 135 200 μm above the bottom of liquid injection section 45. In this state, gas of 25 μL in liquid injection section 45 is sucked at a rate of 500 μL/min., while pressure sensor 136 detecting the degree of the negative pressure in pipette chip 135. Subsequently, pipette chip 135 is moved downward by 100 μm, and gas of 25 μL in liquid injection section 45 is sucked while pressure sensor 136 detecting the degree of the negative pressure in pipette chip 135. This operation is repeated until the degree of the negative pressure in pipette chip 135 exceeds a predetermined threshold, thereby allowing the position of pipette chip 135 with reference to the bottom of liquid injection section 45 to be identified. In case the degree of the negative pressure in pipette chip 135 does not exceed the predetermined threshold even with the number of downward movements of pipette chip 135 exceeding a preset number, it may be determined that any trouble has occurred and the step may be finished.

Figure 7C:
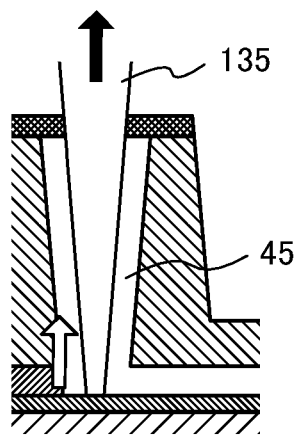
Figure 7D:
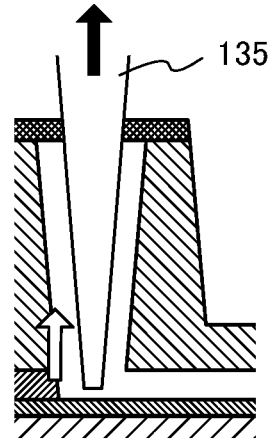
Figure 9:
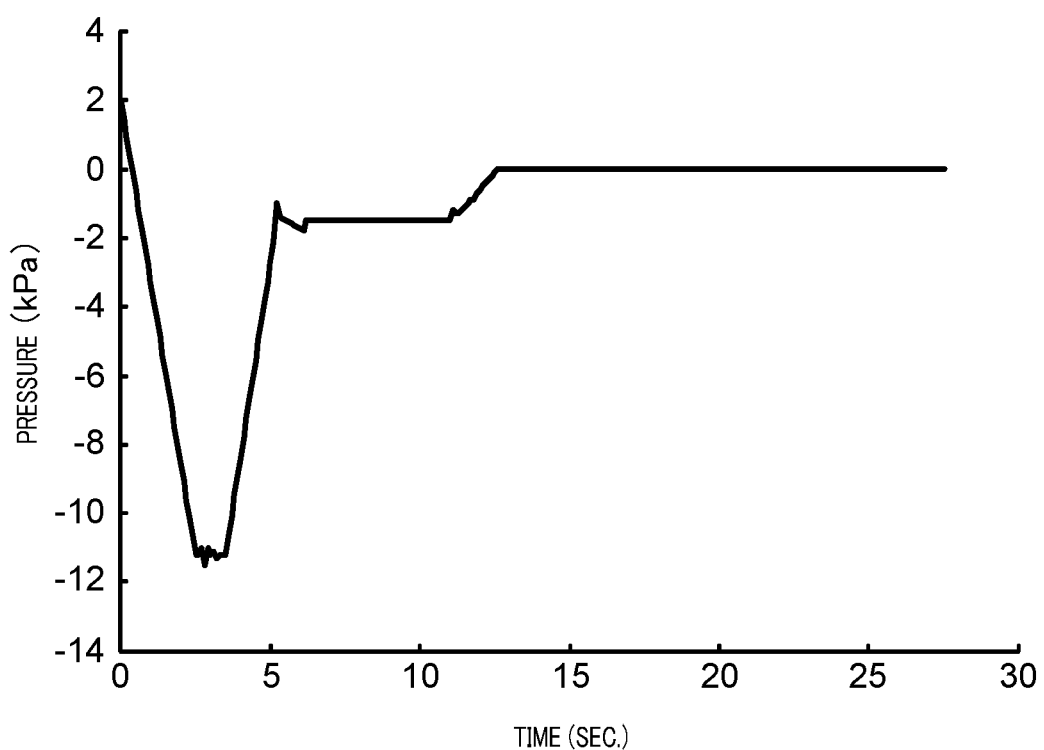
FIG. 9 is a graph illustrating temporary change in pressure in the pipette chip.

As illustrated in FIGS. 7C and 7D, suction of gas into pipette chip 135 may be started in a state where the distal end of pipette chip 135 is in contact with the bottom of liquid injection section 45, and subsequently, pipette chip 135 may be moved toward the opening section of liquid injection section 45. Also at this time, the pressure in pipette chip 135 is detected by pressure sensor 136. Accordingly, as shown in FIG. 9, in the state where the distal end of pipette chip 135 is in contact with the bottom of liquid injection section 45, the degree of the negative pressure in pipette chip 135 is large. When the distal end of pipette chip 135 is apart from the bottom of liquid injection section 45, the degree of the negative pressure in pipette chip 135 significantly decreases. Consequently, the position of the distal end of pipette chip 135 in the case where the degree of the negative pressure in pipette chip 135 significantly decreases can be determined as the position of the bottom of liquid injection section 45.

More specifically, first, based on preliminarily held rough information, pipette chip 135 (nozzle unit 134) is moved so as to position the distal end of pipette chip 135 200 μm below the bottom of liquid injection section 45. In actuality, pipette chip 135 cannot move below the bottom of liquid injection section 45. The distal end of pipette chip 135 can thus be securely brought into contact with the bottom of liquid injection section 45 by moving pipette chip 135 as described above. In this condition, the load applied to the distal end of pipette chip 135 is not so high. Consequently, the distal end of pipette chip 135 is not deformed. In this state, 80 μL of gas in pipette chip 135 is sucked at a rate of 4,800 μL/min., thus causing the inside of pipette chip 135 to have a negative pressure. Subsequently, pipette chip 135 is moved upward until the degree of the negative pressure in pipette chip 135 falls below a threshold. Accordingly, the position of pipette chip 135 with reference to the bottom of liquid injection section 45 can be identified. In case the degree of the negative pressure in pipette chip 135 does not fall below the predetermined threshold even with the number of upward movements or the movement distance of pipette chip 135 exceeding a preset number or distance, it may be determined that any trouble has occurred and the step may be finished.

The method of detecting the position of the distal end of pipette chip 135 by moving first pipette chip 135 downward (FIGS. 7A and 7B) has an advantage capable of reducing the load applied to pipette chip 135. Meanwhile, the method of detecting the position of the distal end of pipette chip 135 by moving second pipette chip 135 upward (FIGS. 7C and 7D) has an advantage of allowing the capacity of syringe pump 133 to be small, and an advantage of completing the position detection in a short time. FIGS. 7A to 7D illustrates the example where gas is sucked into pipette chip 135 in a state without liquid in flow path 44. As described later, even if liquid is sucked into pipette chip 135 in a state with liquid in flow path 44, the position of pipette chip 135 with reference to the bottom of liquid injection section 45 can be identified. According to the above description, driving of syringe pump 133 and movement of pipette chip 135 (nozzle unit 134) are performed intermittently and at different timing. The driving of syringe pump 133 and the movement of pipette chip 135 (nozzle unit 134) may be performed consecutively and simultaneously.

Next, an optical blank value is measured (step S30). In this step, in a state where liquid injection section cover film 42 and pipette chip 135 are sealed, the buffer solution for measurement is injected into flow path 44 (see FIG. 6A) and the buffer solution for measurement is sucked from flow path 44 (see FIG. 6B). Specifically, control section 150 controls conveyance stage 141 to move reaction chip 10 from the installation position to the liquid feeding position. Subsequently, control section 150 controls pipette controller 132 to provide the buffer solution for measurement into liquid injection section 45. At this time, the distal end of pipette chip 135 is apart from the bottom of liquid injection section 45, as illustrated in FIG. 6A. Next, control section 150 controls conveyance stage 141 to move reaction chip 10 from the liquid feeding position to the detection position. Subsequently, control section 150 controls light source controller 113 to cause light source unit 111 to emit excitation light α at the enhancement angle toward metal film 30 (film-formed surface 22). At the same time, control section 150 controls sensor controller 123 to cause light receiving sensor 127 to detect the light intensity of the light, and records the detected value as the blank value. Next, control section 150 controls conveyance stage 141 to move reaction chip 10 from the detection position to the liquid feeding position. Subsequently, control section 150 controls pipette controller 132 to suck the buffer solution for measurement from flow path 44. At this time, as illustrated in FIG. 6B, in a state where the distal end of pipette chip 135 is in contact with or close to the bottom of liquid injection section 45, the liquid is sucked from flow path 44 (first suction). Consequently, the buffer solution for measurement (liquid 73) hardly remains in liquid injection section 45 (see comparison with FIG. 6D). Here, the state where the distal end of pipette chip 135 is close to the bottom of liquid injection section 45 means a state where the distal end of pipette chip 135 is close to the bottom of liquid injection section 45 to an extent where when liquid or gas in liquid injection section 45 is intended to be sucked using pipette chip 135, the degree of the negative pressure in pipette chip 135 is larger than that in a case where the distal end of pipette chip 135 is sufficiently apart from the bottom of liquid injection section 45. For example, the state where the distal end of pipette chip 135 is close to the bottom of liquid injection section 45 is a state where the gap between the distal end of pipette chip 135 and the bottom of liquid injection section 45 exceeds 0 μm and is 100 μm or less.

For removing the buffer solution for measurement at the end of step S30, it is preferable that the position of the distal end of pipette chip 135 be also detected in order to move pipette chip 135 correctly in steps thereafter. Specifically, in a manner analogous to that of the step of detecting the position of the distal end of pipette chip 135 (step S20), the contact state between pipette chip 135 and the bottom of liquid injection section 45 is detected on the basis of the pressure in pipette chip 135 during suction of liquid into pipette chip 135, and the position of pipette chip 135 with reference to the bottom of liquid injection section 45 is identified.

Figure 10A:
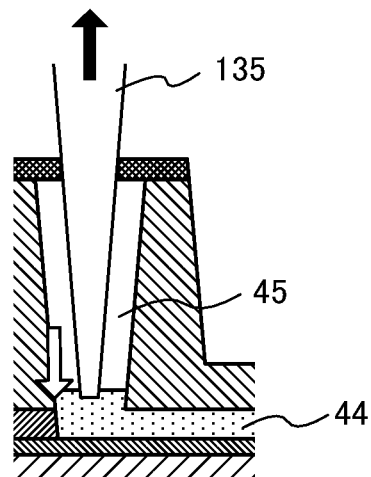
FIGS. 10A to 10D schematically illustrate a step of detecting the position of the distal end of the pipette chip.
Figure 10B:
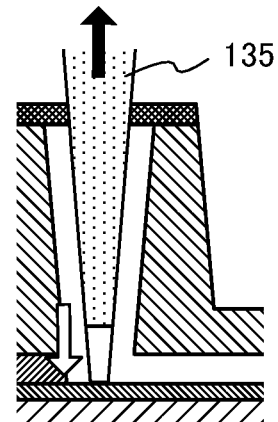

For example, as illustrated in FIGS. 10A and 10B, the liquid in liquid injection section 45 may be sucked into pipette chip 135 while pipette chip 135 is moved toward the bottom of liquid injection section 45. At this time, the pressure in pipette chip 135 is detected by pressure sensor 136. Accordingly, the degree of the negative pressure in pipette chip 135 significantly increases when the distal end of pipette chip 135 comes into contact with the bottom of liquid injection section 45 or immediately before the contact. Consequently, the position of the distal end of pipette chip 135 in the case where the degree of the negative pressure in pipette chip 135 significantly increases can be determined as the position of the bottom of liquid injection section 45.

More specifically, first, based on preliminarily held rough information, pipette chip 135 (nozzle unit 134) is moved so as to position the distal end of pipette chip 135 200 μm above the bottom of liquid injection section 45. In this state, 195 μL of liquid in liquid injection section 45 is sucked at a rate of 500 μL/min., and if there is liquid in liquid injection section 45, most of the liquid is removed. Subsequently, pipette chip 135 is moved downward by 100 μm, and liquid of 25 μL in liquid injection section 45 is sucked while pressure sensor 136 detecting the degree of the negative pressure in pipette chip 135. This operation is repeated until the degree of the negative pressure in pipette chip 135 exceeds a predetermined threshold, thereby allowing the position of pipette chip 135 with reference to the bottom of liquid injection section 45 to be identified. In case the degree of the negative pressure in pipette chip 135 does not exceed the predetermined threshold even with the number of downward movements of pipette chip 135 exceeding a preset number, it may be determined that any trouble has occurred and the step may be finished.

Figure 10C:
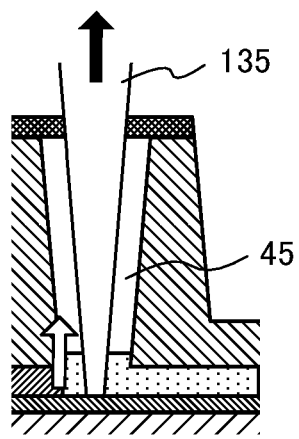
Figure 10D:
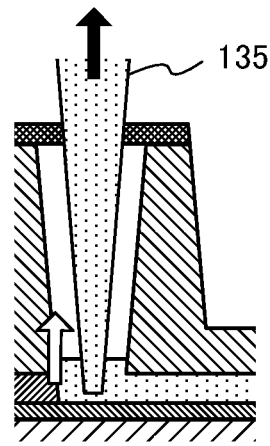

As illustrated in FIGS. 10C and 10D, suction of liquid into pipette chip 135 may be started in a state where the distal end of pipette chip 135 is in contact with the bottom of liquid injection section 45, and subsequently, pipette chip 135 may be moved toward the opening section of liquid injection section 45. Also at this time, the pressure in pipette chip 135 is detected by pressure sensor 136. Accordingly, in the state where the distal end of pipette chip 135 is in contact with the bottom of liquid injection section 45, the degree of the negative pressure in pipette chip 135 is large. When the distal end of pipette chip 135 is apart from the bottom of liquid injection section 45, the degree of the negative pressure in pipette chip 135 significantly decreases. Consequently, the position of the distal end of pipette chip 135 in the case where the degree of the negative pressure in pipette chip 135 significantly decreases can be determined as the position of the bottom of liquid injection section 45.

More specifically, first, based on preliminarily held rough information, pipette chip 135 (nozzle unit 134) is moved so as to position the distal end of pipette chip 135 100 μm below the bottom of liquid injection section 45. In actuality, pipette chip 135 cannot move below the bottom of liquid injection section 45. The distal end of pipette chip 135 can thus be securely brought into contact with the bottom of liquid injection section 45 by moving pipette chip 135 as described above. In this condition, the load applied to the distal end of pipette chip 135 is not so high. Consequently, the distal end of pipette chip 135 is not deformed. In this state, 80 μL of gas or liquid in pipette chip 135 is sucked at a rate of 4,800 μL/min., thus causing the inside of pipette chip 135 to have a negative pressure. Subsequently, pipette chip 135 is moved upward until the degree of the negative pressure in pipette chip 135 falls below a threshold. Accordingly, the position of pipette chip 135 with reference to the bottom of liquid injection section 45 can be identified. In case the degree of the negative pressure in pipette chip 135 does not fall below the predetermined threshold even with the number of upward movements or the movement distance of pipette chip 135 exceeding a preset number or distance, it may be determined that any trouble has occurred and the step may be finished.

As described above, the method of detecting the position of the distal end of pipette chip 135 by moving first pipette chip 135 downward (FIGS. 10A and 10B) has an advantage capable of reducing the load applied to pipette chip 135. Meanwhile, the method of detecting the position of the distal end of pipette chip 135 by moving second pipette chip 135 upward (FIGS. 10C and 10D) has an advantage of allowing the capacity of syringe pump 133 to be small, and an advantage of completing the position detection in a short time. According to the above description, driving of syringe pump 133 and movement of pipette chip 135 (nozzle unit 134) are performed intermittently and at different timing The driving of syringe pump 133 and the movement of pipette chip 135 (nozzle unit 134) may be performed consecutively and simultaneously.

As described above, the incident angle of excitation light α with respect to metal film 30 (film-formed surface 22) of reaction chip 10 is regarded as the enhancement angle. The value of the enhancement angle may be preset, or be determined in another step. The enhancement angle can be determined as the incident angle with the intensity of plasmon scattered light γ being at the maximum when plasmon scattered light γ is detected while the incident angle of excitation light α with respect to metal film 30 (film-formed surface 22) is scanned. The enhancement angle is determined by the material and shape of prism 20, the thickness of metal film 30, the refraction index of liquid in flow path 44 and the like, and slightly varies owing to various factors, such as the type and amount of liquid in flow path 44, the shape error of prism 20 and the like. Accordingly, it is preferable to determine the enhancement angle at every detection.

In a case where a moisturizer is present in flow path 44 of reaction chip 10 at the time of beginning of the step (step S30) of measuring the optical blank value, it is preferable that flow path 44 be cleaned to remove the moisturizer before the buffer solution for measurement is provided into liquid injection section 45. Specifically, control section 150 controls pipette controller 132 to inject the washing liquid into liquid injection section 45 and suck the washing liquid in liquid injection section 45, thus removing the moisturizer in flow path 44.

Next, the first-order reaction is performed (step S40). In this step, in the state where liquid injection section cover film 42 and pipette chip 135 are sealed, the specimen is injected into flow path 44 (see FIG. 6C) and the specimen is sucked from flow path 44 (see FIG. 6D). Specifically, control section 150 controls pipette controller 132 to provide the specimen into liquid injection section 45. At this time, the distal end of pipette chip 135 is apart from the bottom of liquid injection section 45, as illustrated in FIG. 6C. In this state, control section 150 controls pipette controller 132 to repeat alternately the suction of the specimen (liquid 73) in liquid injection section 45 and the injection of the specimen (liquid 73) into liquid injection section 45, thus feeding the specimen (liquid 73) in flow path 44 in a reciprocating manner. Accordingly, the detection target substance contained in the specimen is specifically bonded to the first capturing bodies fixed on metal film 30 in reaction chip 10. Subsequently, control section 150 controls pipette controller 132 to suck the specimen from flow path 44. At this time, as illustrated in FIG. 6D, in a state where the distal end of pipette chip 135 and the bottom of liquid injection section 45 are more apart from each other than in the first suction (the liquid suction performed at the end of step S30), the liquid is sucked from flow path 44 (second suction). Consequently, the specimen (liquid 73) sometimes slightly remains in liquid injection section 45 (see comparison with FIG. 6B).

The types of the specimen and the detection target substance are not specifically limited. Examples of the specimen include body fluid, such as blood, serum, plasma, urine, nostril fluid, saliva, and semen, and their diluted solutions. The examples of the detection target substance contained in the specimens include nucleic acids (DNA, RNA, etc.), proteins (polypeptides, oligopeptides, etc.), amino acids, carbohydrates, lipids, and their modifying molecules.

Next, the inside of flow path 44 is cleaned (step S50). In this step, in a state where liquid injection section cover film 42 and pipette chip 135 are sealed, the washing liquid is injected into flow path 44 (see FIG. 6A) and the washing liquid is sucked from flow path 44 (see FIG. 6B). The type of washing liquid is not specifically limited. The examples of the washing liquid include buffer solution. Specifically, control section 150 controls pipette controller 132 to provide the washing liquid into flow path 44. At this time, the distal end of pipette chip 135 is apart from the bottom of liquid injection section 45, as illustrated in FIG. 6A. In this state, control section 150 controls pipette controller 132 to repeat alternately the suction of the washing liquid (liquid 73) in liquid injection section 45 and the injection of the washing liquid (liquid 73) into liquid injection section 45, thus feeding the washing liquid (liquid 73) in flow path 44 in a reciprocating manner. Accordingly, free detection target substance and the like are removed. Subsequently, control section 150 controls pipette controller 132 to suck the washing liquid from flow path 44. At this time, as illustrated in FIG. 6B, in a state where the distal end of pipette chip 135 is in contact with or close to the bottom of liquid injection section 45, the liquid is sucked from flow path 44 (first suction). Consequently, the washing liquid (liquid 73) hardly remains in liquid injection section 45 (see comparison with FIG. 6D).

For removing the washing liquid at the end of step S50, it is preferable that the position of the distal end of pipette chip 135 be also detected in order to move pipette chip 135 more correctly in steps thereafter. Specifically, in a manner analogous to that of the step of detecting the position of the distal end of pipette chip 135 to be performed at the end of the step of measuring the optical blank value (step S30), the contact state between pipette chip 135 and the bottom of liquid injection section 45 is detected on the basis of the pressure in pipette chip 135 during suction of liquid into pipette chip 135, and the position of pipette chip 135 with reference to the bottom of liquid injection section 45 is identified (see FIGS. 10A to 10D).

Next, the second-order reaction is performed (step S60). In this step, in the state where liquid injection section cover film 42 and pipette chip 135 are sealed, the specimen is injected into liquid injection section 45 (see FIG. 6C) and the specimen is sucked from flow path 44 (see FIG. 6D). Specifically, control section 150 controls pipette controller 132 to provide the label liquid containing the second capturing bodies labelled with the fluorescent substance, into flow path 44. At this time, the distal end of pipette chip 135 is apart from the bottom of liquid injection section 45, as illustrated in FIG. 6C. In this state, control section 150 controls pipette controller 132 to repeat alternately the suction of the label liquid (liquid 73) in liquid injection section 45 and the injection of the label liquid (liquid 73) into liquid injection section 45, thus feeding the label liquid (liquid 73) in flow path 44 in a reciprocating manner.

Accordingly, the second capturing bodies labeled with the fluorescent substance are bonded to the detection target substance bonded to the first capturing bodies on metal film 30. That is, the detection target substance captured by the first capturing bodies is indirectly labelled with the fluorescent substance. Subsequently, control section 150 controls pipette controller 132 to suck the label liquid from flow path 44. At this time, as illustrated in FIG. 6D, in a state where the distal end of pipette chip 135 and the bottom of liquid injection section 45 are more apart from each other than in the first suction (the liquid suction performed at the end of step S30 and the liquid suction performed at the end of step S50), the liquid is sucked from flow path 44 (second suction). Consequently, the label liquid (liquid 73) sometimes slightly remains in liquid injection section 45 (see comparison with FIG. 6B).

The second capturing bodies may be any substance that can be specifically bonded to a site of the detection target substance, the site being different from the site to which the first capturing bodies are to be specifically bonded. The second capturing bodies may be biomolecules specific to the detection target substance, or their fragments. The second capturing body may be made up of one molecule, or a complex made up of two or more molecules bonded to each other.

Next, the inside of flow path 44 is cleaned (step S70). In this step, in a state where liquid injection section cover film 42 and pipette chip 135 are sealed, the washing liquid is injected into flow path 44 (see FIG. 6A) and the washing liquid is sucked from flow path 44 (see FIG. 6B). The type of washing liquid is not specifically limited. The examples of the washing liquid include buffer solution. Specifically, control section 150 controls pipette controller 132 to provide the washing liquid into liquid injection section 45. At this time, the distal end of pipette chip 135 is apart from the bottom of liquid injection section 45, as illustrated in FIG. 6A. In this state, control section 150 controls pipette controller 132 to repeat alternately the suction of the washing liquid (liquid 73) in liquid injection section 45 and the injection of the washing liquid (liquid 73) into liquid injection section 45, thus feeding the washing liquid (liquid 73) in flow path 44 in a reciprocating manner. Accordingly, free second capturing bodies and the like are removed. Subsequently, control section 150 controls pipette controller 132 to suck the washing liquid from flow path 44. At this time, as illustrated in FIG. 6B, in a state where the distal end of pipette chip 135 is in contact with or close to the bottom of liquid injection section 45, the liquid is sucked from flow path 44 (first suction). Consequently, the washing liquid (liquid 73) hardly remains in liquid injection section 45 (see comparison with FIG. 6D).

For removing the washing liquid at the end of step S70, it is preferable that the position of the distal end of pipette chip 135 be also detected in order to move pipette chip 135 correctly in steps thereafter. Specifically, in a manner analogous to that of the step of detecting the position of the distal end of pipette chip 135 to be performed at the end of the step of measuring the optical blank value (step S30), the contact state between pipette chip 135 and the bottom of liquid injection section 45 is detected on the basis of the pressure in pipette chip 135 during suction of liquid into pipette chip 135, and the position of pipette chip 135 with reference to the bottom of liquid injection section 45 is identified (see FIGS. 10A to 10D).

Next, the value of the fluorescent light from the fluorescent substance with which the detection target substance is labeled is measured (step S80). Specifically, control section 150 controls pipette controller 132 to provide the buffer solution for measurement into liquid injection section 45. At this time, the distal end of pipette chip 135 is apart from the bottom of liquid injection section 45, as illustrated in FIG. 6C. Next, control section 150 controls conveyance stage 141 to move reaction chip 10 from the liquid feeding position to the detection position. Subsequently, control section 150 controls light source controller 113 to cause light source unit 111 to emit excitation light α toward metal film 30 (film-formed surface 22). At the same time, control section 150 controls sensor controller 123 to cause light receiving sensor 127 to detect the light intensity of the light having the same wavelength as fluorescent light β.

Lastly, the presence or amount of the detection target substance is calculated (step S90). The fluorescent light value mainly includes the fluorescent light component (signal value) originated from the fluorescent substance with which the detection target substance is labeled, and the optical blank value. Consequently, control section 150 can calculate the signal value correlated to the amount of the detection target substance by subtracting the optical blank value obtained in step S30 from the fluorescent light value obtained in step S80. The value is converted into the amount or concentration of the detection target substance or the like using a preliminarily created calibration curve.

According to the procedures described above, the presence or amount of the detection target substance included in the specimen can be detected.

The detection method (reaction method) according to this embodiment performs the liquid contact step that includes injection of liquid 73 into flow path 44 and suction of liquid 73 from flow path 44 multiple times.

Specifically, the liquid contact steps are performed that include the optical blank value measurement step of injecting and sucking the buffer solution for measurement (step S30), the first-order reaction step of injecting and sucking the specimen (step S40), a cleaning step of injecting and sucking the washing liquid (step S50), the second-order reaction step of injecting and sucking the label liquid (step S60), and the cleaning step of injecting and sucking the washing liquid (step S70).

Among these liquid contact steps, the liquid contact step immediately before the first-order reaction (the optical blank value measurement step; step S30), the liquid contact step immediately before the second-order reaction (cleaning step; step S50), and the liquid contact step immediately before the fluorescent light value measurement (cleaning step; step S70) suck liquid 73 in the state where the distal end of pipette chip 135 is in contact with or close to the bottom of liquid injection section 45 as illustrated in FIG. 6B (first suction).

Accordingly, the remaining liquid after the previous step hardly resides when the specimen is injected in the first-order reaction (step S40), thereby preventing the specimen from being unintentionally diluted and preventing the detection result from being changed. Likewise, the remaining liquid after the previous step hardly resides also when the label liquid is injected in the second-order reaction (step S60), thereby preventing the label liquid from being unintentionally diluted and preventing the detection result from being changed. The remaining liquid after the previous step hardly resides even also when the buffer solution for measurement is injected in the fluorescent light value measurement step (step S80). Consequently, the free second capturing bodies can be prevented from remaining in the flow path, and the detection result can be prevented from being changed.

On the other hand, if the distal end of pipette chip 135 is repetitively brought into contact with the bottom of liquid injection section 45, a possibility occurs that the fitting state of pipette chip 135 with nozzle unit 134 is changed and the shape of the distal end of pipette chip 135 is changed. To prevent this possibility, according to the detection method (reaction method) of this embodiment, in the liquid contact step that does not largely affect the detection result even with liquid 73 slightly remaining in flow path 44, specifically, in the first-order reaction step (step S40) and the second-order reaction step (step S60), as illustrated in FIG. 6D, liquid 73 is sucked (second suction) in a state where the distal end of pipette chip 135 and the bottom of liquid injection section 45 are more apart from each other than that in the first suction (a state where the distal end of pipette chip 135 is not in contact with the bottom of liquid injection section 45).

As described above, according to the detection method (reaction method) of this embodiment, in at least one liquid contact step among the multiple liquid contact steps to be performed, liquid 73 is sucked (first suction) in the state where pipette chip 135 and the bottom of liquid injection section 45 are in contact with or close to each other, and in at least another liquid contact step thereamong, liquid 73 is sucked (second suction) in the state where the distal end of pipette chip 135 and the bottom of liquid injection section 45 are more apart from each other than that in the first suction. Accordingly, the reaction can be appropriately performed, while the number of times of application to pipette chip 135 is reduced to suppress the deformation and positional deviation of pipette chip 135.

Based on position information on the distal end of pipette chip 135 obtained during the first suction, movement control of pipette chip 135 in the following steps is performed, thereby allowing the positional deviation in pipette chip 135 to be reduced. For example, if insertion into and removal from liquid injection section 45 of pipette chip 135 are repeated after detection of the position of pipette chip 135, the position of pipette chip 135 sometimes deviates owing to the load from liquid injection section cover film 42. When the temperature of pipette chip 135 is changed after the detection of the position of pipette chip 135, the size of pipette chip 135 is sometimes changed. Consequently, even if the position of the distal end of pipette chip 135 is identified in an early stage, the position of the distal end of pipette chip 135 sometimes deviates before the subsequent first-order reaction step (step S40), second-order reaction step (step S60) and cleaning step (step S70) immediately before fluorescent light measurement. However, the position of the distal end of pipette chip 135 is simultaneously identified in the liquid contact steps to be performed immediately before the first-order reaction step (step S40), second-order reaction step (step S60) and/or cleaning step (step S70), the positional deviation in pipette chip 135 in the first-order reaction step (step S40), second-order reaction step (step S60) and/or cleaning step (step S70) can be further reduced.

Figure 11:
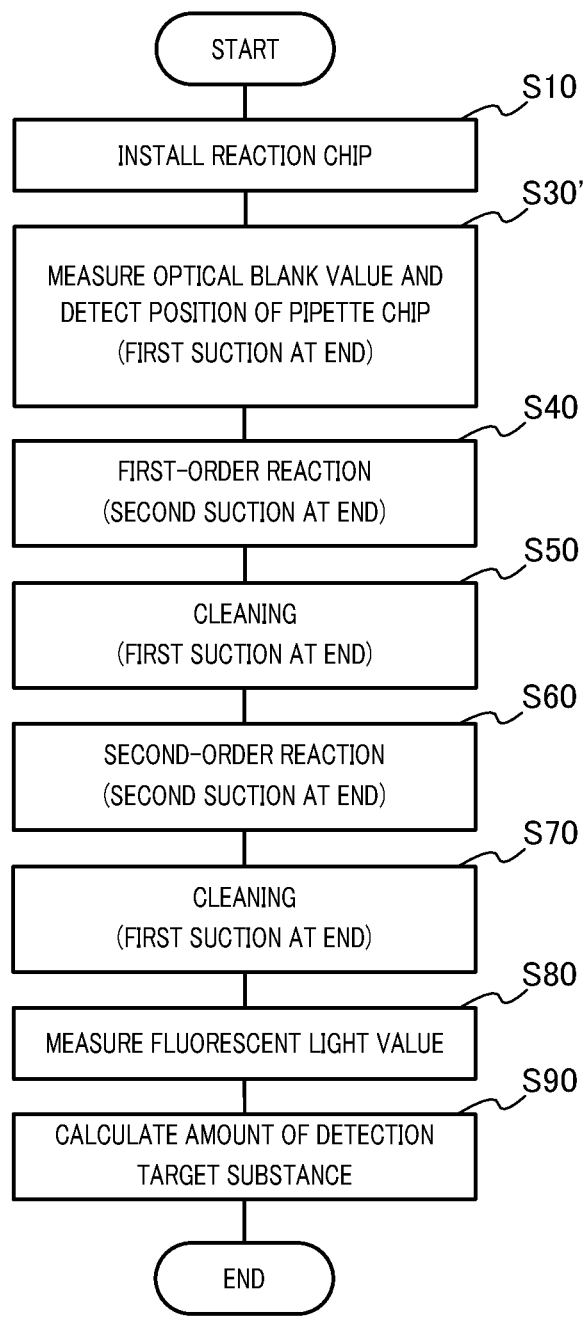
FIG. 11 is a flowchart of a detection method (reaction method) according to a variation example.

In the operation procedures illustrated in FIG. 5, the first detection of the position of pipette chip 135 is an independent step (step S20). However, the first step of detecting the position of pipette chip 135 may be performed simultaneously with another liquid contact step. For example, as illustrated in FIG. 11, in the optical blank value measurement step that injects and sucks the buffer solution for measurement (step S30'), the position of pipette chip 135 may be detected during suction of the buffer solution for measurement from flow path 44. In the optical blank value measurement step (step S30'), the buffer solution for measurement (liquid 73) is sucked in the state where the distal end of pipette chip 135 is in contact with or close to the bottom of liquid injection section 45. Consequently, the buffer solution for measurement (liquid 73) is sucked while the change in pressure in pipette chip 135 is detected, thereby allowing the buffer solution for measurement (liquid 73) to be sucked while identifying the positional relationship between the bottom of liquid injection section 45 and the distal end of pipette chip 135. Accordingly, in comparison with the case where the step of detecting the position of pipette chip 135 and the optical blank value measurement step are independently performed, the detection of the position of pipette chip 135 and the optical blank value measurement can be performed in a short time.

(Effects)

As described above, according to the reaction method in this embodiment, the remaining liquid amount can be minimized in the steps for which reduction in the remaining liquid amount is important, while the number of load applications to pipette chip 135 is reduced to suppress the deformation and positional deviation of pipette chip 135. Consequently, the reaction can be appropriately performed, while the adverse effects of occurrence of bubbles, specimen dilution, label liquid dilution, remaining free second capturing bodies and the like are suppressed. Consequently, the detection apparatus (detection system) and the detection method that use the reaction method in this embodiment can suppress the adverse effects of signal reduction due to bubbles, specimen dilution, label liquid dilution and the like, and highly accurately and quantitatively detect the detection target substance.

In the embodiment described above, the detection apparatus and the detection method that use SPFS have been described. The detection method and the detection apparatus are not limited thereto. The present invention is also applicable to detection apparatuses and detection methods that use the ELISA method, RIfS method, SPR method, QCM, etc.

The present application claims the priority based on Japanese Patent Application No. 2016-122695 filled Jun. 21, 2016. The details described in the specification and the drawings of the application described above are entirely incorporated by reference into the specification of the present application.

INDUSTRIAL APPLICABILITY

The reaction method, the reaction system and the reaction apparatus according to the present invention can appropriately perform the predetermined reaction in the flow path while suppressing the deformation and positional deviation of the pipette chip. As described above, the detection target substance can be detected with a high reliability using the reaction method, the reaction system and the reaction apparatus according to the present invention. Consequently, the reaction method, the reaction system and the reaction apparatus according to the present invention are useful for a clinical examination and the like, for example.

REFERENCE SIGNS LIST

10 Reaction chip
20 Prism
21 Light incident surface
22 Film-formed surface
23 Light emission surface
30 Metal film
40 Flow path cover
41 Frame
42 Liquid injection section cover film
43 Reservoir section cover film
44 Flow path
45 Liquid injection section
46 Reservoir section
47 Ventilation hole
50 Liquid chips
60 Adhesive layer
70 First capturing body
71 Detection target substance
72 Second capturing body
73,73' Liquid
74 Bubbles
100 SPFS apparatus
110 Light irradiation unit
111 Light source unit
112 Angle adjustment mechanism
113 Light source controller
120 Fluorescent light detection unit
121 Light receiving unit
122 Position switching mechanism
123 Sensor controller
124 First lens
125 Optical filter
126 Second lens
127 Light receiving sensor
130 Liquid feeding unit
131 Pipette
132 Pipette controller
133 Syringe pump
134 Nozzle unit
135 Pipette chip
136 Pressure sensor
140 Conveyance unit
141 Conveyance stage
142 Chip holder
150 Control section
α Excitation light
β Fluorescent light
γ Plasmon scattered light

The invention claimed is:

1. A reaction method comprising a reaction step of performing a predetermined reaction in a flow path by performing a liquid contact step multiple times, the liquid contact step including injection of liquid into the flow path and suction of liquid from the flow path by a pipette chip inserted through an opening section into a liquid injection section of a reaction chip including both the flow path and the liquid injection section, the liquid injection section communicating with one end of the flow path and having the opening section, wherein in at least one liquid contact step while the liquid contact step is performed multiple times, a first suction is performed, in which first suction liquid is sucked in a state where the pipette chip and a bottom surface of the liquid injection section are in contact with or close to each other, in at least one liquid contact step while the liquid contact step is performed multiple times, a second suction is performed after the first suction is performed, in which second suction liquid is sucked in a state where the pipette chip and the bottom surface of the liquid injection section are more apart from each other than in the state of the first suction, and the second suction liquid which is sucked in the second suction includes a specimen.

2. The reaction method according to claim 1,
wherein in the first suction, the liquid is sucked in a state where the pipette chip and the bottom surface of the liquid injection section are in contact with each other, and in the second suction, the liquid is sucked in a state where the pipette chip and the bottom surface of the liquid injection section are apart from each other.

3. The reaction method according to claim 1, wherein the injection of the liquid into the flow path and the suction of the liquid from the flow path are performed in a state where the opening section is sealed from the pipette chip.

4. The reaction method according to claim 1, further comprising a position detecting step of identifying a position of the distal end of the pipette chip with reference to the bottom surface of the liquid injection section, by detecting a contact state between the pipette chip and the bottom surface of the liquid injection section, based on a pressure in the pipette chip during suction of liquid or gas into the pipette chip.

5. The reaction method according to claim 4, wherein the position detecting step is performed during the first suction.

6. The reaction method according to claim 5, wherein the liquid contact step to be performed after the first suction performed during execution of the position detecting step moves the pipette chip, based on information on the position of the pipette chip identified in the position detecting step.

7. The reaction method according to claim 1,
wherein the flow path includes a reaction field where a capturing body for capturing a detection target substance is fixed,
the reaction step comprises :
a first-order reaction step as the liquid contact step including injection of specimen liquid containing the detection target substance into the flow path and suction of the specimen liquid from the flow path; and
a second-order reaction step as the liquid contact step to be performed after the first-order reaction step, the second-order reaction step including injection of label liquid containing a fluorescent substance for labelling the detection target substance into the flow path and suction of the label liquid from the flow path, and
the first suction is performed in the liquid contact step performed last of one or two or more liquid contact steps performed before the first-order reaction step, and in the liquid contact step performed last of two or more liquid contact steps performed before the second-order reaction step.

8. The reaction method according to claim 1,
wherein the first suction liquid is injected into the liquid injection section before the first suction.

9. The reaction method according to claim 1,
wherein the specimen is injected into the liquid injection section before the second suction.

10. The reaction method according to claim 1,
wherein in the first suction, a buffer solution or a washing liquid is sucked.

11. The reaction method according to claim 1,
wherein after the second suction, a washing liquid is injected into the flow path.

12. The reaction method according to claim 1,
wherein after the second suction, a washing liquid is injected into the flow path, and subsequently the washing liquid is sucked in the first suction.

13. The reaction method according to claim 1, wherein the first suction liquid is different from the second suction liquid.

14. The reaction method according to claim 1, wherein a specimen injection step is performed immediately after the first suction, and a washer liquid injection step is performed immediately after the second suction.

15. A reaction system, comprising:
a reaction chip including both a flow path and a liquid injection section, the liquid injection section communicating with one end of the flow path and having an opening section;
a pipette configured to inject liquid into the liquid injection section and suck the liquid from the liquid injection section, the pipette having a pipette chip mounted thereon;
a pipette controller configured to control the pipette; and
a computer configured to control the pipette controller according to the following,
wherein the pipette controller causes the pipette to perform injection of the liquid into the flow path and suction of the liquid from the flow path multiple times in a state where the pipette chip is inserted into the liquid injection section through the opening section,
in at least one suction of the liquid while the suction of the liquid is performed multiple times, the pipette controller causes the pipette to perform a first suction, in which first suction liquid is sucked in a state where the pipette chip and a bottom of the liquid injection section are in contact with or close to each other,
in at least one suction of the liquid while the suction of the liquid is performed multiple times, the pipette controller causes the pipette to perform a second suction after the first suction is performed, in which second suction liquid is sucked in a state where the pipette chip and the bottom of the liquid injection section are more apart from each other than in the first sucking, and
the second suction liquid which is sucked in the second suction includes a specimen.

16. The reaction system according to claim 15,
wherein in the first suction, the liquid is sucked in a state where the pipette chip and the bottom of the liquid injection section are in contact with each other, and
in the second suction, the liquid is sucked in a state where the pipette chip and the bottom of the liquid injection section are apart from each other.

17. A reaction apparatus, comprising:
a chip holder configured to hold a reaction chip including both a flow path and a liquid injection section communicating with one end of the flow path and having an opening section;
a pipette on which a pipette chip can be mounted, the pipette being used to inject liquid into the liquid injection section of the reaction chip held by the chip holder, and to suck the liquid from the liquid injection section;
a pipette controller configured to control the pipette; and
a computer configured to control the pipette controller according to the following,
wherein the pipette controller causes the pipette to perform injection of the liquid into the flow path and suction of the liquid from the flow path multiple times in a state where the pipette chip is inserted through the opening section into the liquid injection section of the reaction chip held by the chip holder, in at least one suction of the liquid while the suction of the liquid is performed multiple times, the pipette controller causes the pipette to perform a first suction, in which first suction liquid is sucked in a state where the pipette chip and a bottom of the liquid injection section are in contact with or close to each other, in at least one suction of the liquid while the suction of the liquid is performed multiple times, the pipette controller causes the pipette to perform a second suction after the first suction is performed, in which second suction liquid is sucked in a state where the pipette chip and the bottom of the liquid injection section are more apart from each other than in the first sucking, and the second suction liquid which is sucked in the second suction includes a specimen.

18. The reaction apparatus according to claim 17, wherein in the first suction, the liquid is sucked in a state where the pipette chip and the bottom of the liquid injection section are in contact with each other, and in the second suction, the liquid is sucked in a state where the pipette chip and the bottom of the liquid injection section are apart from each other.

* * * * *